(12) United States Patent
Song et al.

(10) Patent No.: US 12,022,192 B2
(45) Date of Patent: *Jun. 25, 2024

(54) ELECTRONIC DEVICE FOR STABILIZING IMAGE AND METHOD FOR OPERATING SAME

(71) Applicant: Samsung Electronics Co., Ltd., Gyeonggi-do (KR)

(72) Inventors: Wonseok Song, Gyeonggi-do (KR); Bohee Lee, Gyeonggi-do (KR); Sehyun Lee, Gyeonggi-do (KR); Junghwan Jo, Gyeonggi-do (KR); Yonghyun Ha, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,398

(22) Filed: Dec. 13, 2022

(65) Prior Publication Data

US 2023/0113885 A1 Apr. 13, 2023

Related U.S. Application Data

(63) Continuation of application No. 16/795,340, filed on Feb. 19, 2020, now Pat. No. 11,558,553.

(30) Foreign Application Priority Data

Feb. 19, 2019 (KR) .................. 10-2019-0019477

(51) Int. Cl.
*H04N 23/68* (2023.01)
(52) U.S. Cl.
CPC ....... *H04N 23/683* (2023.01); *H04N 23/6812* (2023.01)
(58) Field of Classification Search
None
See application file for complete search history.

(56) References Cited

U.S. PATENT DOCUMENTS

| 6,115,067 A | 9/2000 | Koyama |
| 6,510,283 B1 | 1/2003 | Yamagishi |

(Continued)

FOREIGN PATENT DOCUMENTS

| CN | 105376475 | 3/2016 |
| CN | 106375656 | 2/2017 |

(Continued)

OTHER PUBLICATIONS

International Search Report dated Jun. 16, 2020 issued in counterpart application No. PCT/KR2020/002383, 8 pages.

(Continued)

*Primary Examiner* — Cynthia Segura
(74) *Attorney, Agent, or Firm* — The Farrell Law Firm, P.C.

(57) ABSTRACT

An electronic device includes a first camera having a first angle of view; a second camera having a second angle of view wider than the first angle of view; a motion sensor configured to obtain motion information of the electronic device; a display; a memory; and a processor. The processor is configured to enter a video capturing mode in which the first camera or the second camera is activated; display a live-preview corresponding to the video capturing mode using images obtained via the first camera or the second camera; while in the video capturing mode, display a user interface including a first graphical object indicative of a first degree of motion stabilization and a second graphical object indicative of a second degree of motion stabilization greater than the first degree of motion stabilization; receive an input via the user interface to select one of the first graphical object or the second graphical object; based on the first graphical object being selected, display a live-preview by performing, based on the motion information and a first marginal area having a first size, a first digital image (Continued)

stabilization with respect to images obtained via the first camera; and based on the second graphical object being selected, display a live-preview by performing, based on the motion information and a second marginal area having a second size larger than the first size, a second digital image stabilization with respect to images obtained via the second camera.

22 Claims, 20 Drawing Sheets

(56) References Cited

U.S. PATENT DOCUMENTS

| | | | |
|---|---|---|---|
| 6,747,691 | B1 | 6/2004 | Satoh et al. |
| 9,525,821 | B2* | 12/2016 | Chang ............... H04N 5/145 |
| 9,563,103 | B2 | 2/2017 | Takeuchi |
| 9,628,712 | B2 | 4/2017 | Fujita et al. |
| 9,860,448 | B2 | 1/2018 | Yoo et al. |
| 9,912,869 | B2 | 3/2018 | Miyahara |
| 10,218,907 | B2* | 2/2019 | Gyotoku ............ H04N 23/6812 |
| 10,382,686 | B2* | 8/2019 | Kang .................. H04N 23/45 |
| 10,715,761 | B2 | 7/2020 | Lee et al. |
| 11,558,553 | B2* | 1/2023 | Song ................. H04N 23/683 |
| 2005/0061952 | A1 | 3/2005 | Kawahara |
| 2014/0285677 | A1 | 9/2014 | Fujita et al. |
| 2016/0054642 | A1 | 2/2016 | Takeuchi |
| 2016/0165137 | A1 | 6/2016 | Kang |
| 2017/0026580 | A1 | 1/2017 | Gyotoku |
| 2017/0201684 | A1 | 7/2017 | Kang et al. |
| 2017/0208250 | A1 | 7/2017 | Uemura |
| 2018/0048825 | A1* | 2/2018 | Wang ................ H04N 23/45 |
| 2019/0034756 | A1 | 1/2019 | Kim |
| 2019/0068886 | A1 | 2/2019 | Baek |
| 2019/0089906 | A1 | 3/2019 | Joo |
| 2019/0222763 | A1 | 7/2019 | Takayanagi |
| 2020/0077023 | A1 | 3/2020 | Kang |

FOREIGN PATENT DOCUMENTS

| | | |
|---|---|---|
| CN | 107018313 | 8/2017 |
| CN | 108476277 | 8/2017 |
| CN | 107666581 | 2/2018 |
| CN | 107750451 | 3/2018 |
| CN | 107770433 | 3/2018 |
| EP | 3 276 950 | 3/2018 |
| JP | 2002-333644 | 11/2002 |
| JP | 2014-171110 | 9/2014 |
| JP | 5869876 | 2/2016 |
| JP | 5910565 | 4/2016 |
| KR | 1020140116023 | 10/2014 |
| KR | 10-2016-0087682 | 7/2016 |
| KR | 10-2017-0013102 | 2/2017 |
| KR | 1020170083439 | 7/2017 |
| KR | 10-2018-0003235 | 1/2018 |

OTHER PUBLICATIONS

European Search Report dated Feb. 7, 2022 issued in counterpart application No. 20759704.8-1209, 10 pages.
Chinese Office Action dated Mar. 29, 2023 issued in counterpart application No. 202080015565.0, 17 pages.
Indian Examination Report dated Apr. 12, 2023 issued in counterpart application No. 202117041274, 6 pages.
Korean Office Action dated Aug. 21, 2023 issued in counterpart application No. 10-2019-0019477, 14 pages.
Chinese Office Action dated Sep. 20, 2023 issued in counterpart application No. 202080015565.0, 11 pages.
KR Notice of Final Rejection dated Feb. 28, 2024 issued in counterpart application No. 10-2019-0019477, 8 pages.

* cited by examiner

ELECTRONIC DEVICE FOR STABILIZING IMAGE AND METHOD FOR OPERATING SAME

CROSS-REFERENCE TO RELATED APPLICATION(S)

This application is a Continuation Application of U.S. patent application Ser. No. 16/795,340, filed on Feb. 19, 2020, in the United States Patent and Trademark Office, which is based on and claims priority under 35 U.S.C. § 119 to Korean Patent Application No. 10-2019-0019477, filed on Feb. 19, 2019, in the Korean Intellectual Property Office, the disclosure of which is incorporated by reference herein in its entirety.

BACKGROUND

1. Field

The disclosure relates generally to an electronic device for providing an image capture function and, more particularly to an electronic device for stabilizing an image using a hand-shaking prevention technique and a method for operating the same.

2. Description of Related Art

With the development of information communication and semiconductor technologies, various types of electronic devices have been developed into multimedia devices that provide various multimedia services. For example, electronic devices provide various multimedia services such as a messenger service, a broadcast service, a wireless internet service, a camera service, and a music playback service. Electronic devices include high pixel camera modules, and thus can take still images and moving images and can provide distinctive pictures to which various photographic effects are applied.

Recently, a hand-shaking correction function has been provided to prevent a problem related to an afterimage occurring on a captured image due to a user's hand shaking or an unintentional motion in the case where a user takes a photograph using an electronic device. Video digital image stabilization or digital image stabilization may be used as a hand-shaking correction scheme.

In general, such a video digital image stabilization scheme may correct shaking of a plurality of images (or image frames) based on the motion of an input image (e.g., motion of a subject or a background) and the motion of an electronic device. For example, the electronic device may correct shaking of the image by digital image stabilization which determines a part of an input image (e.g., 90% of a region of an input image) as an output region based on a margin region (e.g., a correction range) and moves an output region within the input image in a direction opposite the motion of the electronic device.

In addition, the performance of a stabilization scheme may be determined by the size ratio of an output image to an input image. The size ratio may be the size of a margin region obtained by subtracting the output image from the input image. For example, the wider the margin region, the wider the motion range of the output region, which means that correction for a large motion is possible.

However, the size of an image that can be obtained by an electronic device requiring consideration of the portability is limited. For this reason, the digital image stabilization scheme of an electronic device may be suitable for correction for a small motion but may cause a problem of outputting an unnatural image if the correction is performed on a large motion.

SUMMARY

The present disclosure has been made to address the above-mentioned problems and disadvantages, and to provide at least the advantages described below.

In accordance with an aspect of the disclosure, an electronic device includes a first camera having a first angle of view; a second camera having a second angle of view wider than the first angle of view; a motion sensor configured to obtain motion information of the electronic device; a display; a memory; and a processor. The processor is configured to enter a video capturing mode in which the first camera or the second camera is activated; display a live-preview corresponding to the video capturing mode using images obtained via the first camera or the second camera; while in the video capturing mode, display a user interface including a first graphical object indicative of a first degree of motion stabilization and a second graphical object indicative of a second degree of motion stabilization greater than the first degree of motion stabilization; receive an input via the user interface to select one of the first graphical object or the second graphical object; based on the first graphical object being selected, display a live-preview by performing, based on the motion information and a first marginal area having a first size, a first digital image stabilization with respect to images obtained via the first camera; and based on the second graphical object being selected, display a live-preview by performing, based on the motion information and a second marginal area having a second size larger than the first size, a second digital image stabilization with respect to images obtained via the second camera.

In accordance with another aspect of the disclosure, an electronic device is provided that includes a first camera having a first angle of view; a second camera having a second angle of view wider than the first angle of view; a motion sensor configured to obtain motion information of the electronic device; a display; a memory; and a processor. The processor is configured to display a live-preview by performing, based on the motion information and a first marginal area having a first size, a first digital image stabilization with respect to images obtained via the first camera, while displaying the live-preview by performing the first digital image stabilization, display a first graphical object indicative of a first degree of motion stabilization corresponding to the first digital image stabilization, in response to a user input for changing from the first digital image stabilization to the second digital image stabilization, display a live-preview by performing, based on the motion information and a second marginal area having a second size larger than the first size, the second digital image stabilization with respect to images obtained via the second camera, and while displaying the live-preview by performing the second digital image stabilization, display a second graphical object indicative of a second degree of motion stabilization corresponding to the second digital image stabilization.

In accordance with another aspect of the disclosure, a method of operating an electronic device including a first camera having a first angle of view and a second camera having a second angle of view wider than the first angle of view is provided. The method including entering a video capturing mode in which the first camera or the second camera is activated; displaying a live-preview corresponding to the video capturing mode using images obtained via the first camera or the second camera; while in the video capturing mode, displaying a user interface including a first graphical object indicative of a first degree of motion stabilization and a second graphical object indicative of a second degree of motion stabilization greater than the first degree of motion stabilization; receiving an input via the user interface to select one of the first graphical object or the second graphical object; obtaining, via a motion sensor, motion information of the electronic device; based on the first graphical object being selected, displaying a live-preview by performing, based on the motion information and a first marginal area having a first size, a first digital image stabilization with respect to images obtained via the first camera; and based on the second graphical object being selected, display a live-preview by performing, based on the motion information and a second marginal area having a second size lager than the first size, a second digital image stabilization with respect to images obtained via the second camera.

In accordance with another aspect of the disclosure, a method of operating an electronic device including a first camera having a first angle of view and a second camera having a second angle of view wider than the first angle of view. The method including obtaining, via a motion sensor, motion information of the electronic device; displaying a live-preview by performing, based on the motion information and a first marginal area having a first size, a first digital image stabilization with respect to images obtained via the first camera, while displaying the live-preview by performing the first digital image stabilization, displaying a first graphical object indicative a first degree of motion stabilization corresponding to the first digital image stabilization, in response to a user input for changing from the first digital image stabilization to the second digital image stabilization, display a live-preview by performing, based on the motion information and a second marginal area having a second size larger than the first size, the second digital image stabilization with respect to images obtained via the second camera, and while displaying the live-preview by performing the second digital image stabilization, displaying a second graphical object indicative of a second degree of motion stabilization corresponding to the second digital image stabilization.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
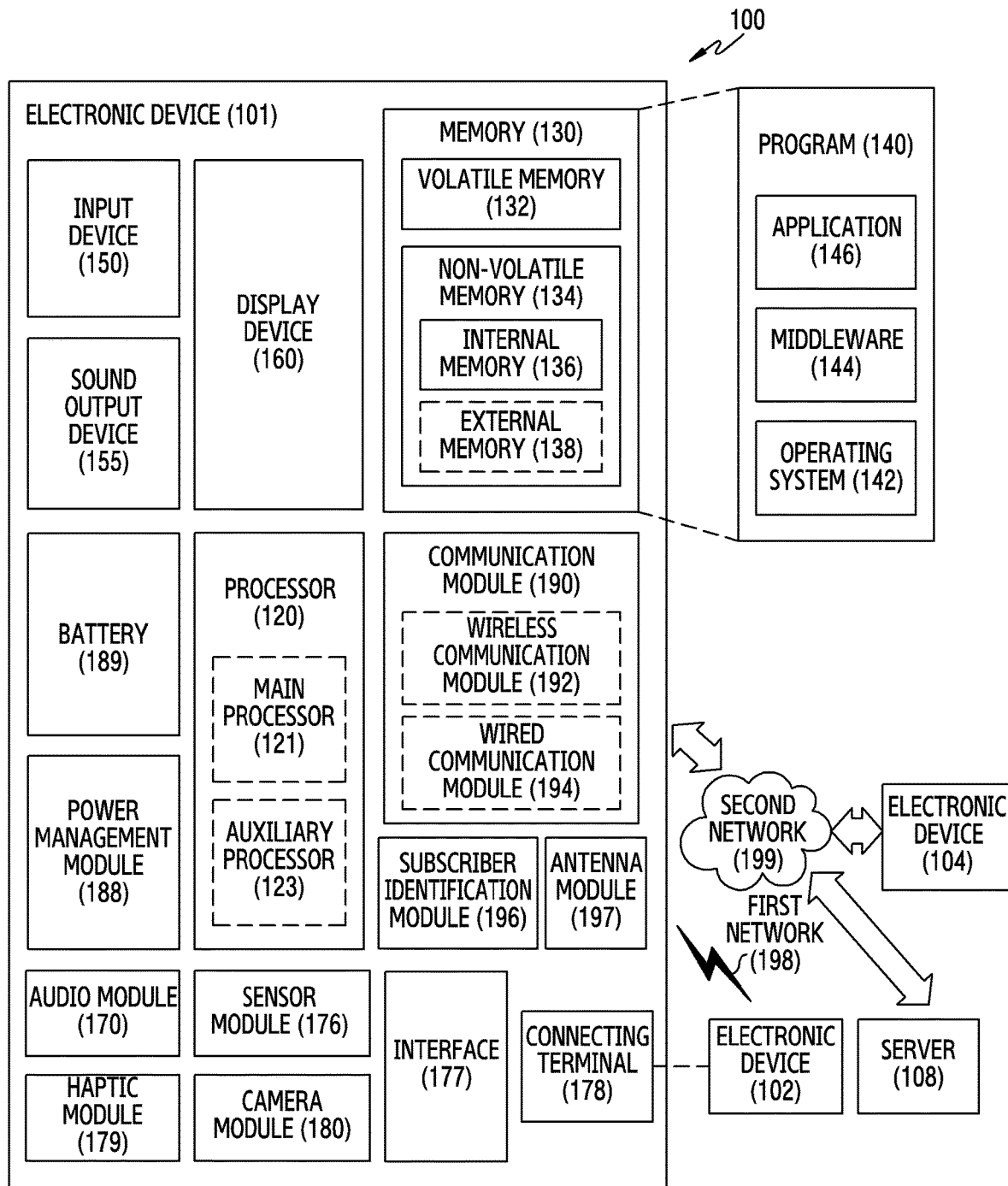
FIG. 1 is a block diagram of an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Various embodiments of the disclosure are to provide a method and an apparatus which correct shaking of a large motion as well as shaking of a small motion by an electronic device.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
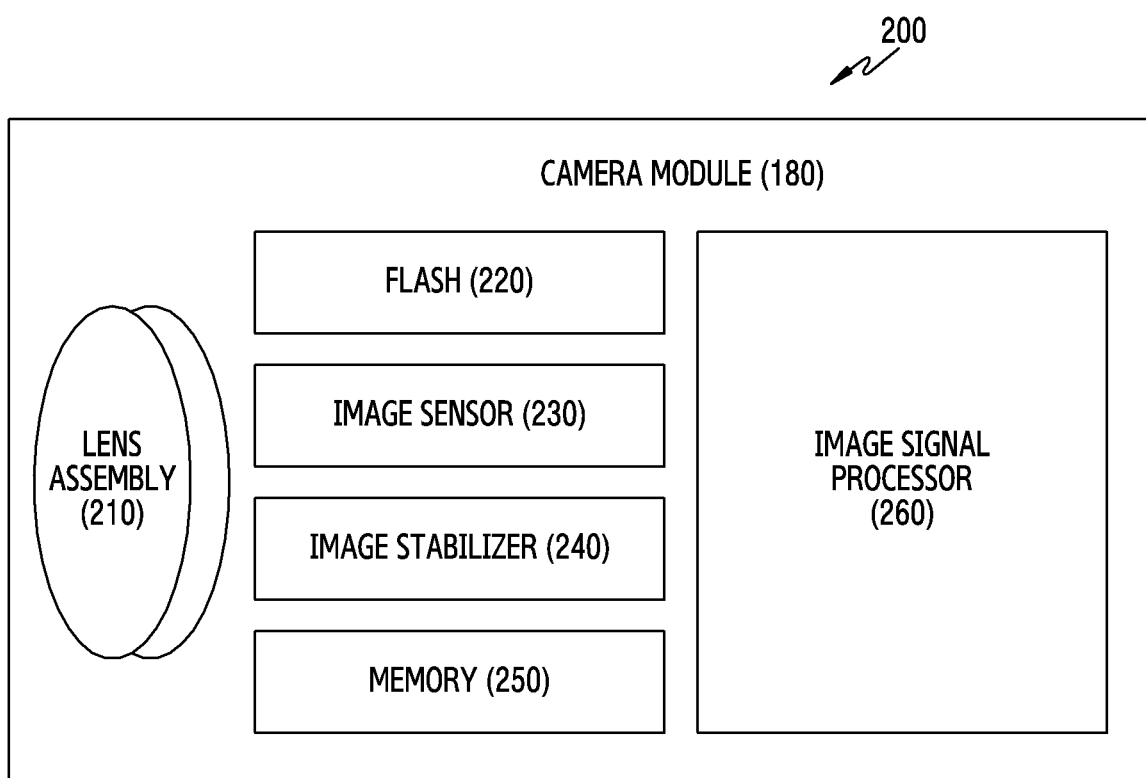
FIG. 2 is a block diagram showing a camera module, according to an embodiment.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an ISP 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the ISP 260. According to an embodiment, the memory 250 may be configured as at least part of the memory 130 or as a separate memory that is operated independently from the memory 130.

The ISP 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the ISP 260 may perform control (e.g., exposure time control or read-out timing control) with respect to at least one (e.g., the image sensor 230) of the components included in the camera module 180. An image processed by the ISP 260 may be stored back in the memory 250 for further processing, or may be provided to an external component (e.g., the memory 130, the display device 160, the electronic device 102, the electronic device 104, or the server 108) outside the camera module 180. According to an embodiment, the ISP 260 may be configured as at least part of the processor 120, or as a separate processor that is operated independently from the processor 120. If the ISP 260 is configured as a separate processor from the processor 120, at least one image processed by the ISP 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
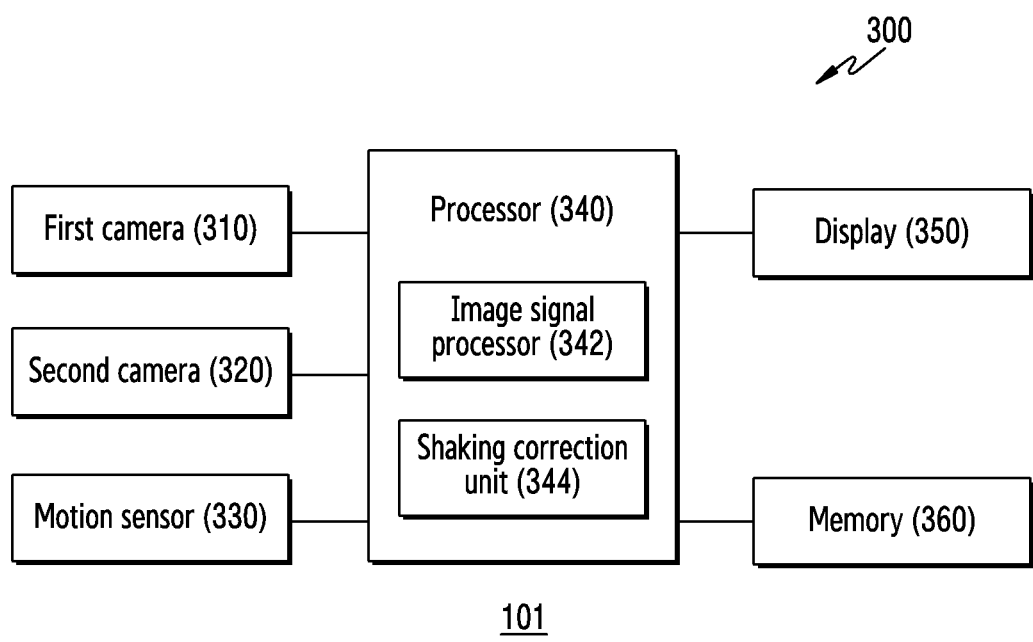
FIG. 3A is a block diagram showing the configuration of an electronic device, according to an embodiment.

FIG. 3A is a block diagram 300 showing the configuration of an electronic device, according to an embodiment.

Referring to FIG. 3A, the electronic device includes a first camera 310, a second camera 320, a motion sensor 330, a processor 340, a display 350, and a memory 360.

A first camera 310 and a second camera 320 may be a camera module 180, and may capture (or obtain) an image (e.g., a photo or a video) viewed through a lens. For example, the first camera 310 and the second camera 320 may capture an image respectively or simultaneously. The first camera 310 and the second camera 320 may have different angles of view. For example, one of the first camera 310 or the second camera 320 may have an angle of view wider than that of the other camera. If the second camera 320 has an angle of view wider than that of the first camera 310, the second camera 320 may capture an image of a wide angle of view, which includes an image captured by the first camera 310. At least a part of the images captured by the first camera 310 and the second camera 320 may be output as a preview image through a display 350 (e.g., a display device 160), or may be stored in a memory 130.

A motion sensor 330 (e.g., a sensor module 176) may detect motion of the electronic device. The motion sensor 330 may detect motion of the electronic device while an image is being acquired through at least one of the first camera 310 or the second camera 320. For example, the motion sensor 330 may be activated if at least one of the first camera 310 or the second camera 320 is operated. The motion sensor 330 may include a gyro sensor (or a gyroscope). Additionally or alternatively, the motion sensor 330 may be configured with various sensors capable of detecting motion of the electronic device, such as an acceleration sensor.

A processor 340 may control the overall operation of the electronic device. The processor 340 may include an ISP 342 and a shaking correction unit 344. Additionally or alternatively, the ISP 342 and the shaking correction unit 344 may be configured as a separate processor that is operated independently of the processor 340.

The processor 340 may determine a stabilization scheme for performing an image stabilization operation. As described later with reference to FIGS. 5A and 5B, the stabilization scheme may include a first stabilization scheme 334 for correcting shaking of an image based on a first margin region (e.g., a correction range), and a second stabilization scheme for correcting shaking of an image based on a second margin region larger than the first margin region. The margin region is a region in which shaking can be corrected, and may be obtained by subtracting an output region from an input image.

The processor 340 may determine one of the first stabilization scheme or the second stabilization scheme as a scheme for performing an image stabilization operation in response to detection of an image acquisition event (e.g., video capturing mode execution). The processor 340 may operate such that the scheme for performing the image stabilization operation is changed to another scheme (e.g., the second stabilization scheme) while the image stabilization operation is being performed using one of the first stabilization scheme or the second stabilization scheme. The stabilization scheme may be determined based on motion information of the electronic device (or image). Additionally or alternatively, the stabilization scheme may be selected based on user input as described with reference to FIGS. 14 and 15. For example, the processor 340 may determine a stabilization scheme by providing a stabilization scheme selection guide and sensing an input for the stabilization scheme selection guide.

The processor 340 may stabilize the at least one image acquired through the first camera 310 or the second camera 320, based on the determined stabilization scheme, to correct shaking of the image. The processor 340 may perform the stabilization operation by controlling the ISP 342 and the shaking correction unit 344.

The ISP 342 may perform at least a part of a stabilization operation on a plurality of images acquired using the first camera 310 and the second camera 320. For example, the ISP 342 may crop a region from a plurality of images (or a plurality of input images) acquired using the first camera 310 and the second camera 320. A cropped image (e.g., an output region of an input image) may be output as a preview image through the display 350 or stored in the memory 360. For example, the size of the output region may be designated in advance. The ISP 342 may secure a first margin region by cropping a designated output region in an image of a first size, acquired through the first camera 310. The output region may be determined based on at least one of the specified number of pixels, a designated field of view, or a designated angle of view. In addition, the ISP 342 may secure a second margin region larger than the first margin region by cropping an output region having a designated size in an image of a second size, acquired through the second camera 320. The margin region is a region, in which shaking can be corrected, and may be a region obtained by subtracting the output region from the input image.

The shaking correction unit 344 may perform a stabilization operation on the plurality of images based on the first stabilization scheme. The first stabilization scheme may be a scheme for correcting shaking of a plurality of images of a first size acquired through the first camera 310. The image of the first size may include a first margin region as described above. In an embodiment, the shaking correction unit 344 may adjust the position of an output region in an input image acquired through the first camera 310 based on motion information on the acquired image. The motion information may include first motion information on the motion of a subject or a background within the image, and second motion information on the motion of the electronic device. The first motion information may be acquired based on a result of comparing (e.g., comparing feature points) a plurality of images, and the second motion information may be acquired based on the motion sensor 330 of the electronic device. In addition, the first motion information and the second motion information may include translation component information and rotation component information. The translation component information may be information associated with translation coordinates, and the rotation component information may be information associated with an angle of rotation or inclination. For example, the shaking correction unit 344 may adjust the position of an output region of a current input image in the direction in which a subject has moved (or in the direction opposite the direction in which the electronic device has moved) in the output region of the current input image (e.g., an $n_{th}$ input image) acquired through the first camera 310 based on an output region of a previously input image (e.g., a $n-1_{th}$ input image) acquired through the first camera 310. For example, the shaking correction unit 344 may perform shaking correction, that is, the image stabilization operation, by adjusting the position of the output region in the first margin region of the input image having the first size.

The shaking correction unit 344 may perform a stabilization operation on a plurality of images based on the second stabilization scheme. The second stabilization scheme may be a scheme for correcting shaking of a plurality of images of a second size acquired through the second camera 320. The image of the second size may include a second margin region that is larger than the first margin region as described above.

The shaking correction unit 344 may adjust the position of an output region in an input image acquired through the second camera 320 based on motion information on the acquired image. For example, the shaking correction unit 344 may adjust the position of an output region for a current input image in the direction in which a subject has moved (or in the direction opposite the direction in which the electronic device has moved) in the output region of the current input image (e.g., an $n_{th}$ input image) acquired through the second camera 320 based on an output region of a previously input image (e.g., a $n-1_{th}$ input image) acquired through the second camera 320. The shaking correction unit 344 may perform shaking correction, that is, the image stabilization operation, by adjusting the position of the output region in the second margin region, having a size larger than that of the first margin region.

The processor 340 may correct rolling shutter distortion of at least one image based on motion information of the electronic device (or the image) while correcting shaking of a plurality of images.

Figure 3B:
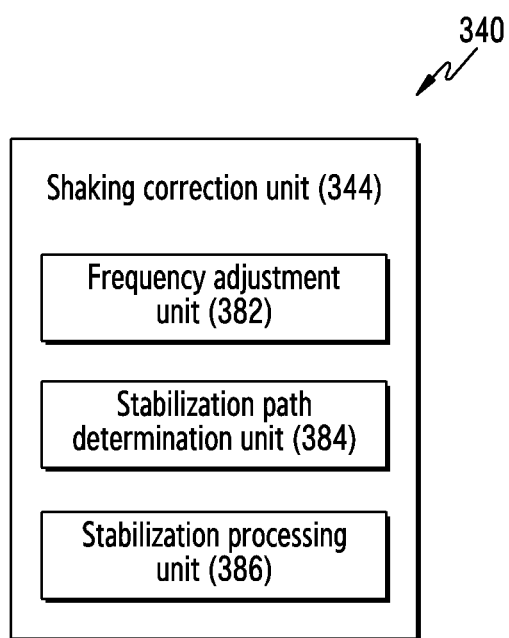
FIG. 3B is a block diagram showing the configuration of a shaking correction unit, according to an embodiment.

FIG. 3B is a block diagram 380 showing the configuration of a shaking correction unit, according to an embodiment.

Referring to FIG. 3B, the shaking correction unit 344 may include a frequency adjustment unit 382, a stabilization path determination unit 384, and a stabilization processing unit 386.

The frequency adjustment unit 382 may determine the frequency of detection of motion information. The detection frequency may include the frequency of detection by the motion sensor 330. The frequency adjustment unit 382 may detect motion information based on a first specified frequency (e.g., approximately 100 hertz (Hz)) if the motion of the electronic device (or the image) is included in a designated frequency determination range (e.g., if the motion is small), and may increase the motion detection frequency to a second frequency (e.g., approximately 400 Hz to 500 Hz) if the motion is out of the designated frequency determination range (e.g., if the motion is large), thereby improving the performance of the image stabilization operation and achieving efficient battery consumption.

The frequency adjustment unit 382 may determine the detection frequency based on the number of acquired images (e.g., the frame rate). For example, the frequency adjustment unit 382 may detect motion information based on a first specified frequency (e.g., approximately 100 Hz) if a frame rate is included in a designated frequency determination range (e.g., if the frame rate does not exceed 60 frames per second (fps)), and may increase the motion detection frequency to a second frequency (e.g., approximately 400 Hz to 500 Hz) if the motion is out of the designated frequency determination range (e.g., if exceeding 60 fps), thereby improving the performance of shaking and rolling shutter distortion correction. The above-described numerical values for the motion detection frequency are examples for better understanding, and the disclosure is not limited thereto. For example, the numerical value or the numerical range for the motion detection frequency may be changed by the designer and/or the performance of the electronic device.

The stabilization path determination unit 384 may determine the stabilization path such that a shaking correction region (e.g., an output region of an input image) is not located outside of the original image. Determining a stabilization path may be also referred to as camera path planning. The motion of the electronic device or the image may be considered if the stabilization path determination unit 384 determines a stabilization path. As described above, the motion information may be determined based on a result of comparison of a plurality of images or sensor information acquired through the motion sensor 330 of the electronic device. For example, as described below with reference to FIG. 10, if the motion information is included in a first determination range, the stabilization path determining 384 may determine a stabilization path based on a first parameter. Additionally or alternatively, if the motion information of the electronic device is included in a second determination range, the stabilization path determination unit 384 may determine the stabilization path based on a second parameter.

The stabilization processing unit 386 may dynamically control a stabilization operation, that is, the intensity of shaking correction. The stabilization processing unit 386 may reduce an image jitter phenomenon occurring due to the motion of the electronic device by adjusting the correction intensity based on the motion of the electronic device. For example, the stabilization processing unit 386 may prevent the occurrence of image jitter by lowering a shutter speed to a first speed if the motion of the electronic device (or the image) is included in a designated intensity adjustment range (for example, if the motion is small enough to avoid image jitter) and increasing the shutter speed to a second speed if the motion is out of the designated intensity adjustment range (e.g., if the motion is large enough to cause image jitter). The stabilization processing unit 386 may reduce the image jitter phenomenon occurring due to the motion of the electronic device by adjusting the correction intensity, based on at least one of motion information and ambient brightness information. For example, if the ambient brightness and the motion are included in the designated intensity adjustment range (e.g., if the motion of the electronic device located in a room is large), the stabilization processing unit 386 may lower the image stabilization performance to a first level and increase the image jitter improvement performance to a second level. Here, lowering the correction performance may mean lowering the correction intensity.

The shaking correction may be based on the position (or trajectory) of a camera before a stabilization path determination and the position (or trajectory) of the camera after the stabilization path determination. For example, the shaking correction amount may be the difference between the position (or trajectory) of the camera before the stabilization path determination and the position (or trajectory) of the camera after the stabilization path determination. For example, the stabilization processing unit 360 may lower the correction performance to the first level to correct only a part of the correction amount. In addition, if the ambient brightness and the motion are out of the designated intensity adjustment range (e.g., if the motion of the electronic device located in a room is small), the stabilization processing unit 384 may also increase the shaking correction performance to the second level and reduce the image jitter improvement performance to the first level. For example, the stabilization processing unit 360 may increase the correction performance to the second level to correct the entire correction amount.

According to an embodiment, the electronic device may include a camera, a motion sensor, a memory, and at least one processor. The at least one processor may be configured to acquire motion information of the electronic device from the motion sensor according to an image acquisition mode (i.e., upon executing an image acquisition mode), determine an image stabilization scheme, based on at least a part of the motion information, and perform a stabilization operation on at least one image acquired through the camera, based on the determined image stabilization scheme. For example, the image stabilization scheme may include a first stabilization scheme for correcting shaking of the at least one image based on a first margin region and a second stabilization scheme for correcting shaking of the at least one image based on a second margin region larger than the first margin region.

The camera may include a first camera having a first angle of view and a second camera having a second angle of view wider than the first angle of view. The processor may be configured to operate the first camera in response to the determination of the first stabilization scheme and operate the second camera in response to the determination of the second stabilization scheme.

The processor may be configured to determine an image acquisition speed for acquiring the plurality of images and determine a frequency of detection by the motion sensor based on at least one of the image acquisition speed and the motion size.

The processor may be configured to process the acquired motion information if it is impossible to change to the determined frequency of detection.

The processor may be configured to determine a parameter for determining a stabilization path for correcting the at least one image based on the motion information of the electronic device.

The processor may be configured to determine the ambient brightness of the electronic device and determine the intensity of a stabilization operation based on at least one of the ambient brightness or the size of the motion information of the electronic device.

The electronic device may further include a display. The processor may be configured to output notification information corresponding to the determined intensity of the stabilization operation through the display.

The processor may be configured to detect the motion of the electronic device in the state in which one of the first image stabilization scheme and the second image stabilization scheme is selected and change the selected image stabilization scheme to another image stabilization scheme if the detected motion satisfies a stabilization scheme change condition.

The electronic device may further include a display. The processor may be configured to output information notifying the changed image stabilization scheme through the display.

According to an embodiment, the electronic device may include a camera, a display, a memory, and at least one processor. The at least one processor may be configured to output a user interface designated to select one of a first stabilization scheme or a second stabilization scheme according to the execution at an image acquisition mode, select one of the first stabilization scheme or the second stabilization scheme based on input, and perform a stabilization operation on at least one image acquired through the camera based on the selected image stabilization scheme.

The processor may be configured to acquire an image of a first size including a first correction region in response to the selection of the first stabilization scheme, and acquire an image of a second size, including a second correction region that is larger than the first correction region, in response to the selection of the second stabilization scheme.

Figure 4:
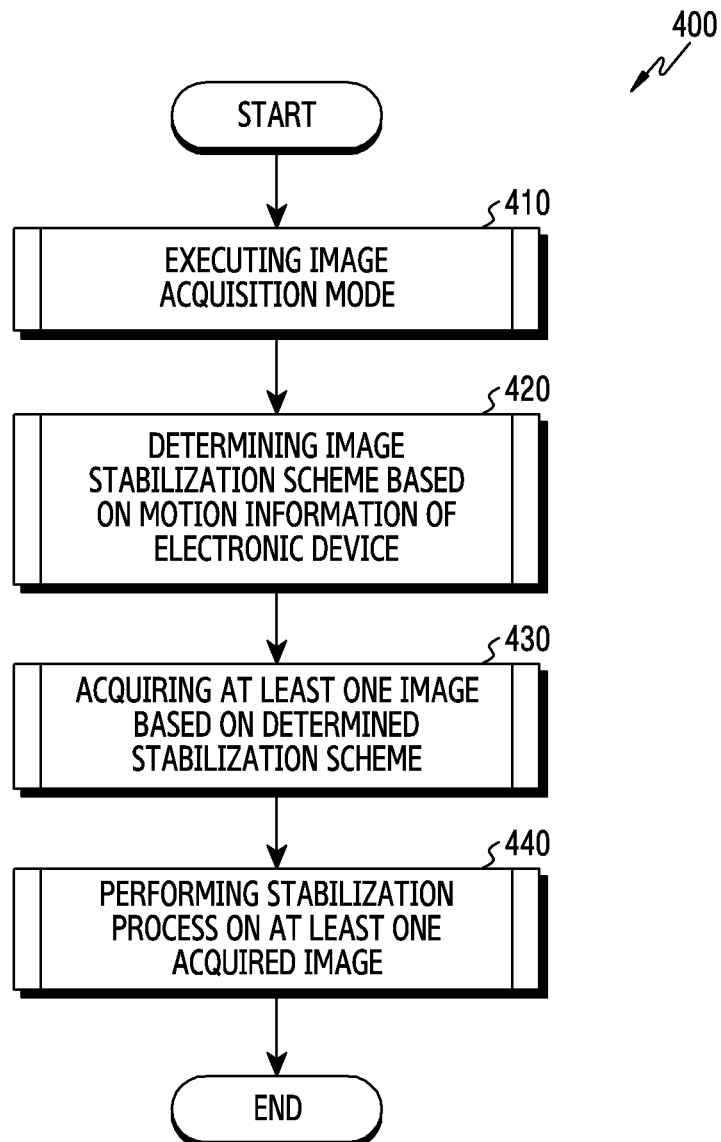
FIG. 4 is a flowchart of an image stabilization operation performed by an electronic device, according to an embodiment.
Figure 5A:
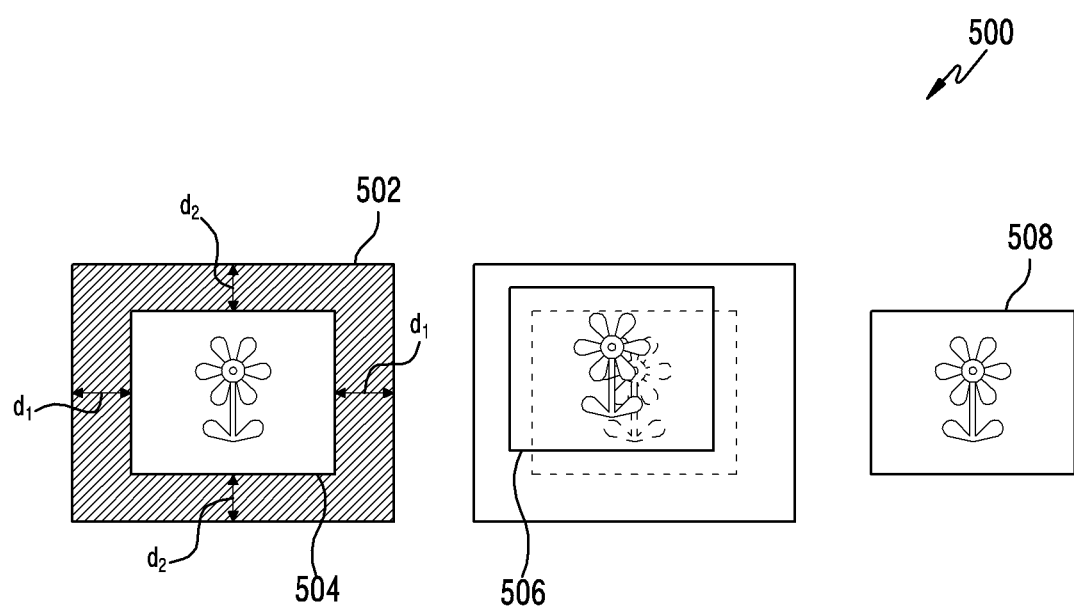
FIG. 5A illustrates a stabilization scheme of an electronic device, according to an embodiment.
Figure 5B:
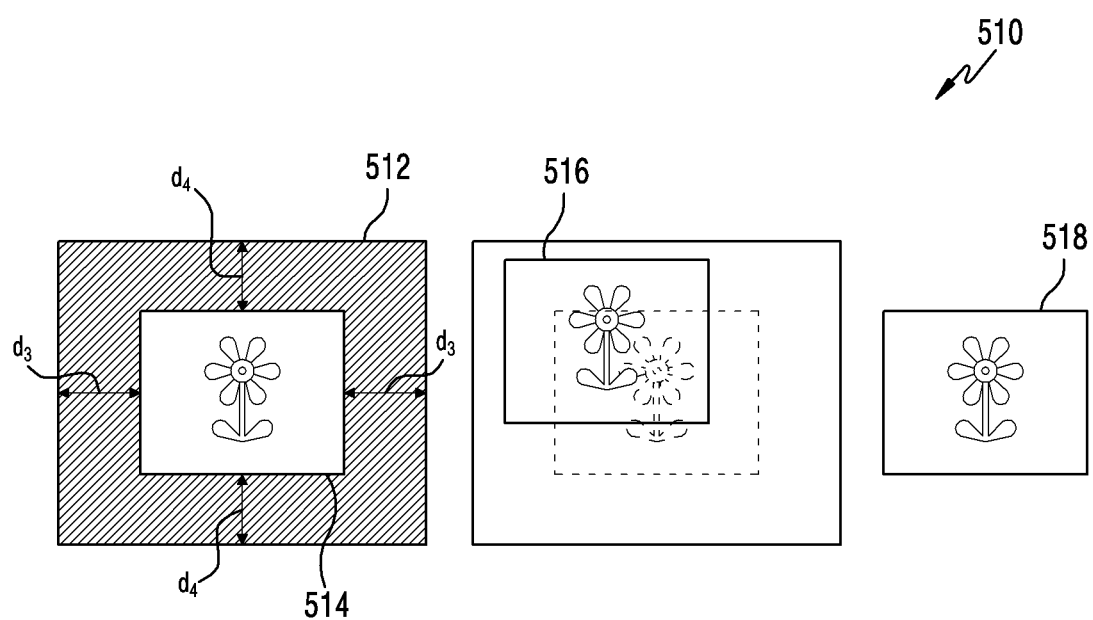
FIG. 5B illustrates a stabilization scheme of an electronic device, according to an embodiment.

FIG. 4 is a flowchart 400 for performing an image stabilization operation by an electronic device, according to an embodiment. FIG. 5A is a view 500 illustrating a stabilization scheme of an electronic device according to an embodiment. FIG. 5B is a view 510 illustrating a stabilization scheme of an electronic device, according to an embodiment. The steps in FIG. 4 may be performed sequentially, but are not necessarily performed sequentially. For example, the order of each step may be changed, or at least two steps may be performed in parallel.

Referring to FIG. 4, the electronic device (e.g., the processor 340) performs an image acquisition mode in step 410. The image acquisition mode may include a mode of acquiring at least one image through at least one of the first camera 310 (or the first image acquisition device) or the second camera 320 (or the second image acquisition device). The first camera 310 may acquire an image having a first angle of view, and the second camera 320 may acquire an image having a second angle of view larger than the first angle of view.

The electronic device determines an image stabilization scheme, in step 420, based on the motion information of the electronic device. The processor 340 may determine one of the first stabilization scheme and the second stabilization scheme as a scheme for performing an image stabilization operation. The first stabilization scheme may be a scheme, as illustrated in FIG. 5A, for securing a first margin region (e.g., d1 and d2) by cropping a designated output region 504 from a plurality of first-size images 502 acquired through the first camera 310. For example, the output region may be determined based on at least one of the specified number of pixels, a designated field of view, or a designated angle of view, as described above. In addition, the first stabilization scheme may correct 508 shaking of an image by adjusting 506 the position of the output region in the first margin region in the direction in which a subject has moved (or the direction opposite the direction in which the electronic device has moved). The second stabilization scheme may be a scheme, as illustrated in FIG. 5B, for securing a second margin region (e.g., d3 and d4) by cropping the designated output region 514 from a plurality of second-size images 512 acquired through the second camera 320. The image of the second size may be a size larger than the image of the first size. The second stabilization scheme may correct shaking of the image by adjusting the position of the output region in the second margin region having a larger size than the first margin region in a direction in which a subject has moved (or the direction opposite the direction in which the electronic device has moved). The processor 340 may determine the image stabilization scheme based on at least one of motion information of the electronic device or user input.

The electronic device acquires at least one image in step 430 based on the determined stabilization scheme. The processor may operate one of the first camera or the second camera based on the determined stabilization scheme.

The electronic device performs stabilization on at least one acquired image in step 440. The processor 340 may correct shaking of the image using video digital image stabilization technology.

Figure 6A:
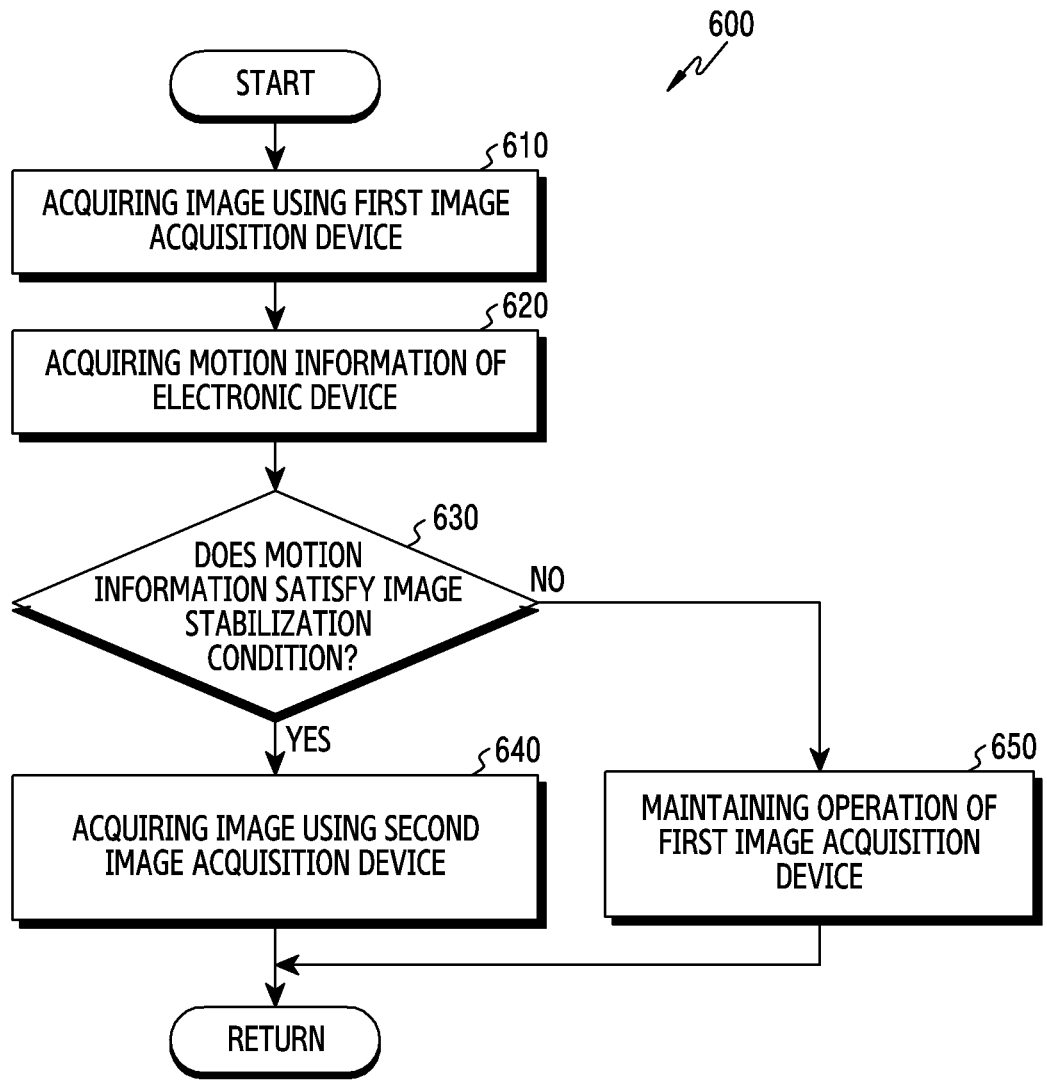
FIG. 6A is a flowchart of an image stabilization scheme, according to an embodiment.
Figure 6B:
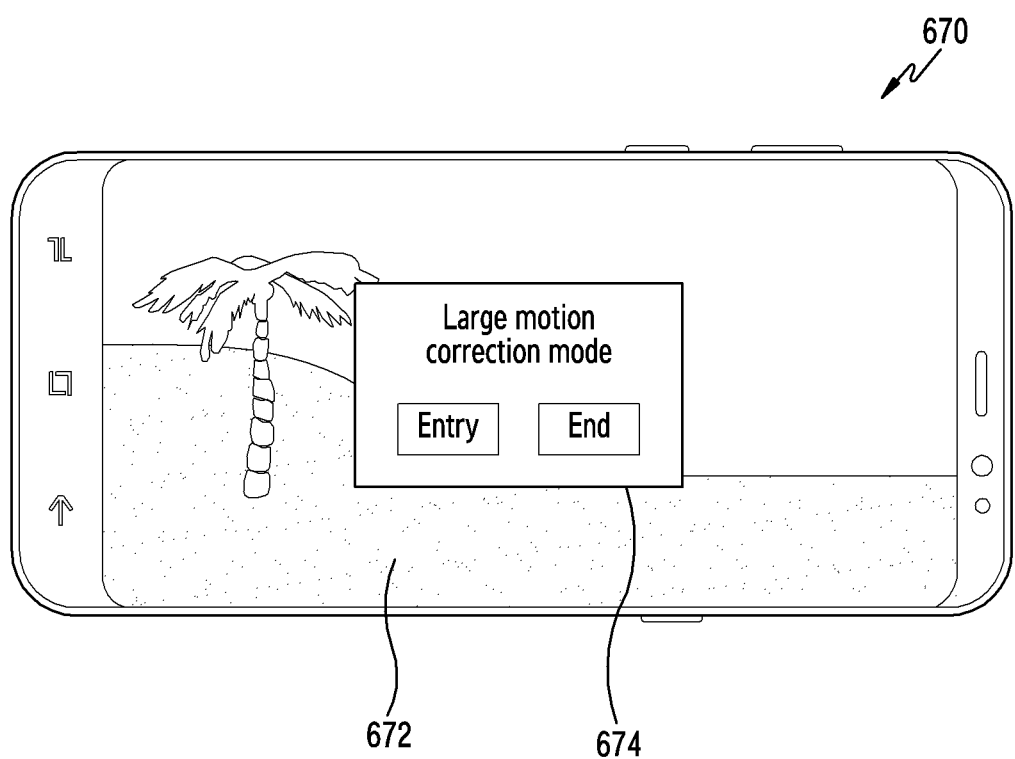
FIG. 6B illustrates a situation in which an image stabilization scheme is guided by an electronic device, according to an embodiment.

FIG. 6A is a flowchart 600 of an image stabilization scheme determined by an electronic device, according to an embodiment. FIG. 6B is a view 370 illustrating the situation in which an image stabilization scheme is guided in an electronic device, according to an embodiment. The steps of FIGS. 6A to 6C, described below, may represent various embodiments of steps 420 and 430. The steps may be performed sequentially, but are not necessarily performed sequentially. For example, the order of each step may be changed, or at least two steps may be performed in parallel.

Referring to FIG. 6A, the electronic device (e.g., the processor 340) acquires at least one image using the first camera 310 (or the first image acquisition device) in step 610. As described above, the first camera 310 may acquire an image of a first size having a first angle of view. The first angle of view may be within an approximate range of 50° and 80°. If a small motion below the reference range is sensed, the processor 340 may secure a first margin region by cropping the designated output region in the image of the first size. In addition, the processor 340 may perform the shaking correction, that is, the image stabilization operation by adjusting the position of an output region in the first margin region of an input image.

The electronic device acquires motion information of the electronic device in step 620. The motion information may include translation component information and rotation component information. The translation component information may be information associated with the translation coordinates, and the rotation component information may be information associated with an angle of rotation or inclination. The processor 340 may acquire motion information through the motion sensor 330. Additionally or alternatively, the processor 340 may acquire motion information based on a result of a comparison of images (e.g., feature point comparison) acquired through the first camera 310.

The electronic device determines whether the motion information satisfies an image stabilization condition in step 630. The image stabilization condition may be the reference value for determining whether the shaking of an output image occurs due to the motion of the electronic device. For example, the processor 340 may determine that the image stabilization condition is satisfied if the motion of the electronic device is greater than or equal to the reference motion. If the motion of the electronic device is less than the reference motion, the processor 340 may determine that the image stabilization condition is not satisfied.

If it is determined that the image stabilization condition is satisfied, the electronic device acquires at least one image by using the second camera 320 (or the second image acquisition device) in step 640. As described above, the second camera 320 may acquire an image of a second size having a second angle of view that is wider than the first angle of view. The second angle of view may be within the approximate range of 70° and 130°. If a large motion beyond the reference range is sensed, the processor 340 may secure a second margin region by cropping a designated output region in the image of the second size. In addition, the processor 340 may perform the shaking correction, that is, the image stabilization operation by adjusting the position of the output region in the second margin region of an input image. If it is determined that the image stabilization condition is satisfied, the processor 340 may also output guide information for changing the image stabilization scheme.

As illustrated in FIG. 6B, the processor 340 may output, through a display 672, guide information 674 reporting that the image stabilization scheme according to the motion of the electronic device is executed. As illustrated in the drawing, the guide information 674 may include a menu for selecting or canceling a change to the image stabilization scheme. The processor 340 may change an image stabilization scheme corresponding to the motion of the electronic device or may control such that the previous image stabilization scheme is maintained, based on an input of the guide information 674.

If it is determined that the image stabilization condition is not satisfied, the electronic device maintains the operation of the first image acquisition device in steps 650.

In the above-described embodiment, a configuration of changing the camera for acquiring an image from the first camera 310 to the second camera 320, based on the motion information, has been described. In contrast to the above-described embodiment, while an image is being acquired through the second camera 320, an image may be acquired through the first camera 310 based on the motion information.

Figure 6C:
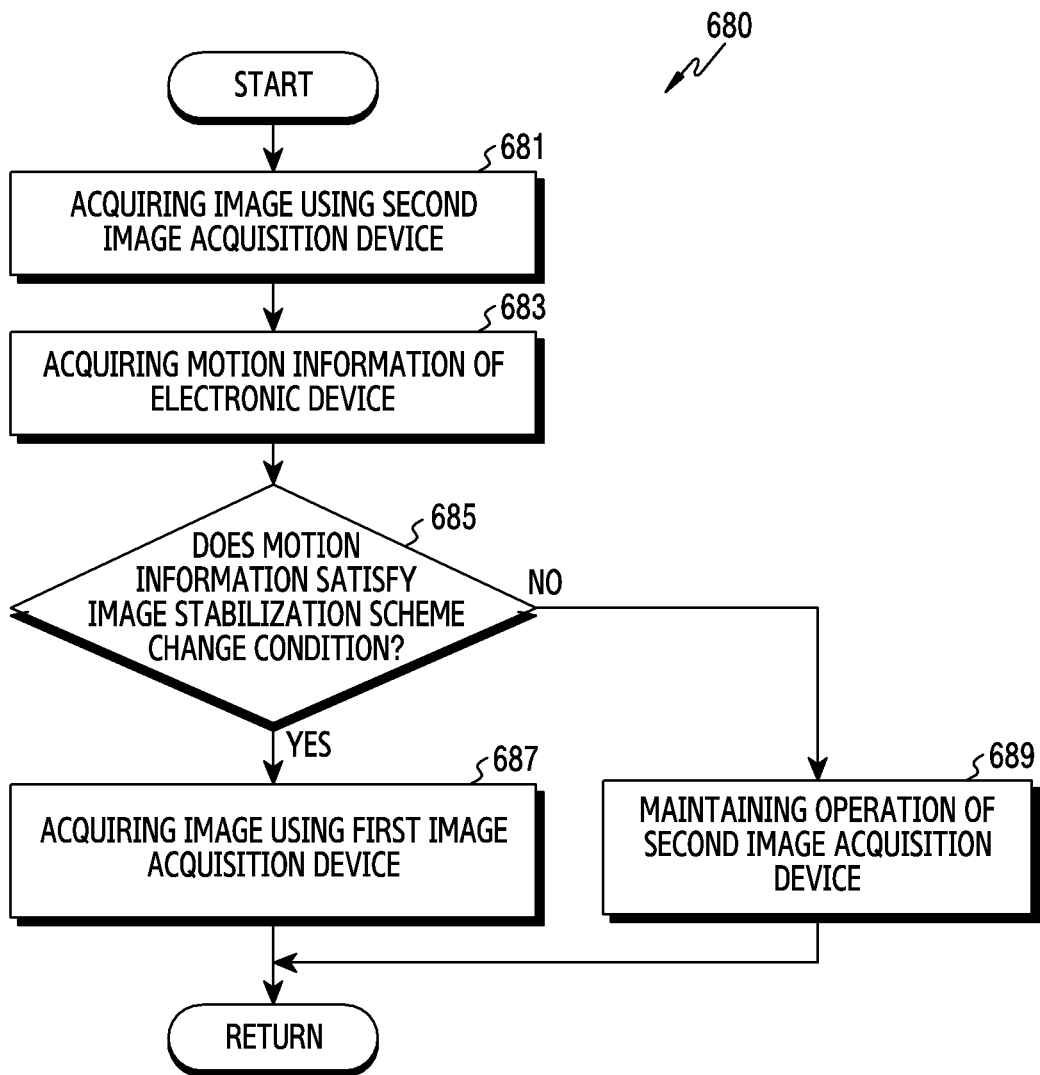
FIG. 6C is a flowchart describing an operation of determining an image stabilization scheme by an electronic device, according to an embodiment.

FIG. 6C is a flowchart 680 describing another operation of determining an image stabilization scheme by an electronic device, according to an embodiment. The steps of FIG. 6C described below may represent various embodiments of step 640 of FIG. 6A. In the following embodiments, the steps may be performed sequentially, but are not necessarily performed sequentially. For example, the order of each step may be changed, or at least two steps may be performed in parallel.

Referring to FIG. 6C, the electronic device acquires at least one image using the second camera 320 (or the second image acquisition device) in step 681. As described above, the second camera 320 may acquire an image of a second size having a second angle of view.

The electronic device acquires motion information of the electronic device in step 683. As described above, the motion information may include translation component information and rotation component information. For example, the processor 340 may acquire motion information through the motion sensor 330. Additionally or alternatively, the processor 340 may acquire motion information based on a result of a comparison of images (e.g., feature point comparison) acquired through the second camera 320.

The electronic device determines whether the motion information satisfies an image stabilization scheme change condition in step 685. The image stabilization scheme change condition may be a reference value for determining whether an amount of shaking less than the reference motion occurs due to the motion of the electronic device. For example, if the motion of the electronic device is less than the reference motion, the processor 340 may determine that the image stabilization scheme change condition is satisfied. In addition, if the motion of the electronic device is greater than or equal to the reference motion, the processor 340 may determine that the image stabilization scheme change condition is not satisfied.

If the electronic device determines that the image stabilization scheme change condition is satisfied (for example, if the motion of the electronic device is decreased less than the reference motion), at least one image is acquired using the first camera 310 (or the first image acquisition device) in step 687. As described above, the first camera 310 may acquire an image of a first size having a first angle of view that is narrower than the second angle of view.

If the electronic device determines that the image stabilization condition is not satisfied (for example, if the motion of the electronic device is maintained above the reference motion), the operation of the second image acquisition device is maintained in step 689.

Figure 7:
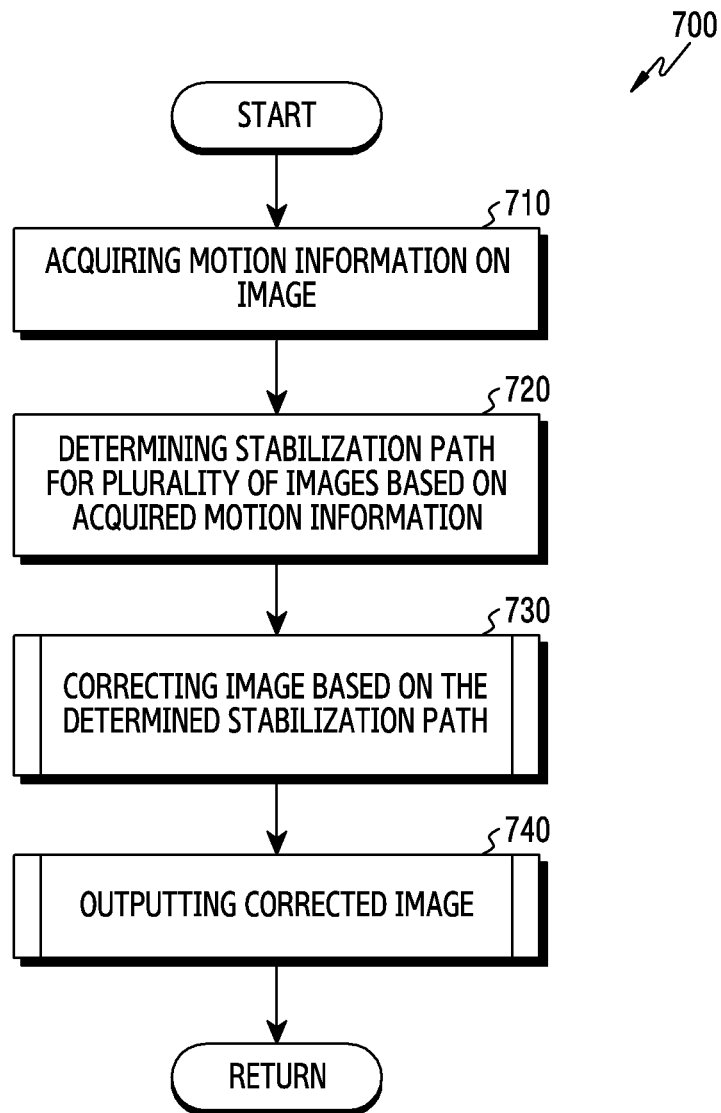
FIG. 7 is a flowchart describing an image stabilization operation by an electronic device, according to an embodiment.

FIG. 7 is a flowchart 700 for describing an image stabilization operation in an electronic device, according to an embodiment. The steps of FIG. 7 described below may represent various embodiments of step 640 of FIG. 6A. In the following embodiments, the steps may be performed sequentially, but are not necessarily performed sequentially. For example, the order of each step may be changed, or at least two steps may be performed in parallel.

Referring to FIG. 7, according to various embodiments, the electronic device (e.g., the processor 340) acquires motion information on the acquired image (or motion information of the electronic device) in step 710. For example, the processor 340 may periodically acquire motion information while the second-size image is acquired through the second camera 320 (or the second image acquisition device).

The electronic device determines a stabilization path for the acquired image of a second size in step 720, based on the acquired motion information. Determining the stabilization path may be referred to as camera path planning. The processor 340 may determine a stabilization path which positions an output region of an image (e.g., an input image) in a direction corresponding to the motion of the image (e.g., the subject), or opposite the motion of the electronic device, based on the motion information. For example, if the electronic device 100 is shaken to the left and thus subjects included in input images are moved to the right, the processor 340 may determine the stabilization path that positions the output region of the image in the left direction.

The electronic device corrects at least one image acquired through the second camera 320 (or the second image acquisition device) in step 730, based on the determined stabilization path. For example, the processor 340 may adjust the position of an output region within a margin region of an input image so that the output region is not located outside of the input image. The processor 340 may correct rolling shutter distortion of at least one image, based on motion information of the electronic device (or the image) while correcting shaking of a plurality of images.

The electronic device outputs the corrected image through the display 350 (or the display device 160) in step 740. The processor 340 may store the corrected image inside the electronic device (e.g., the memory 360) or outside the electronic device.

Figure 8:
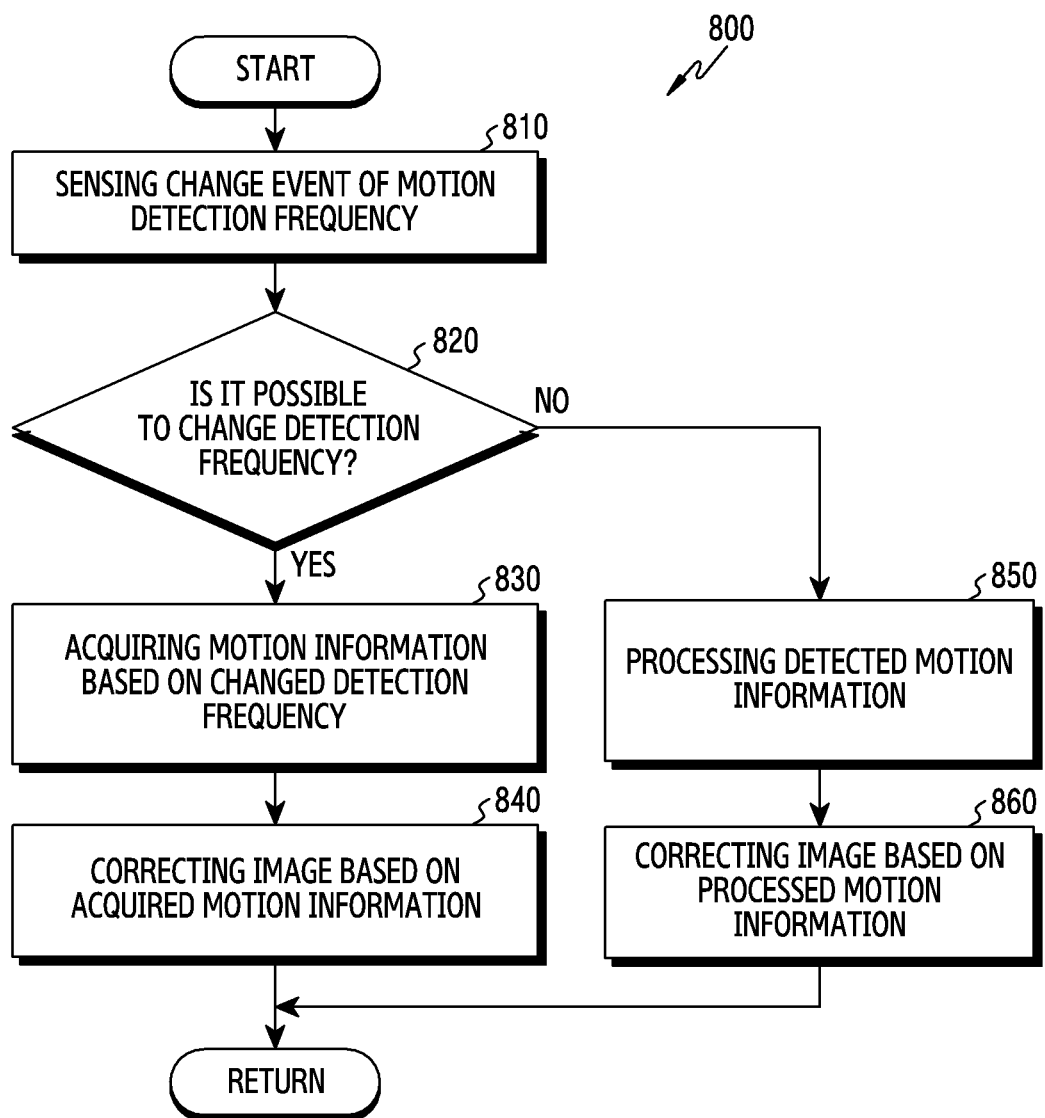
FIG. 8 is a flowchart describing an operation of correcting rolling shutter distortion by an electronic device, according to an embodiment.
Figure 9A:
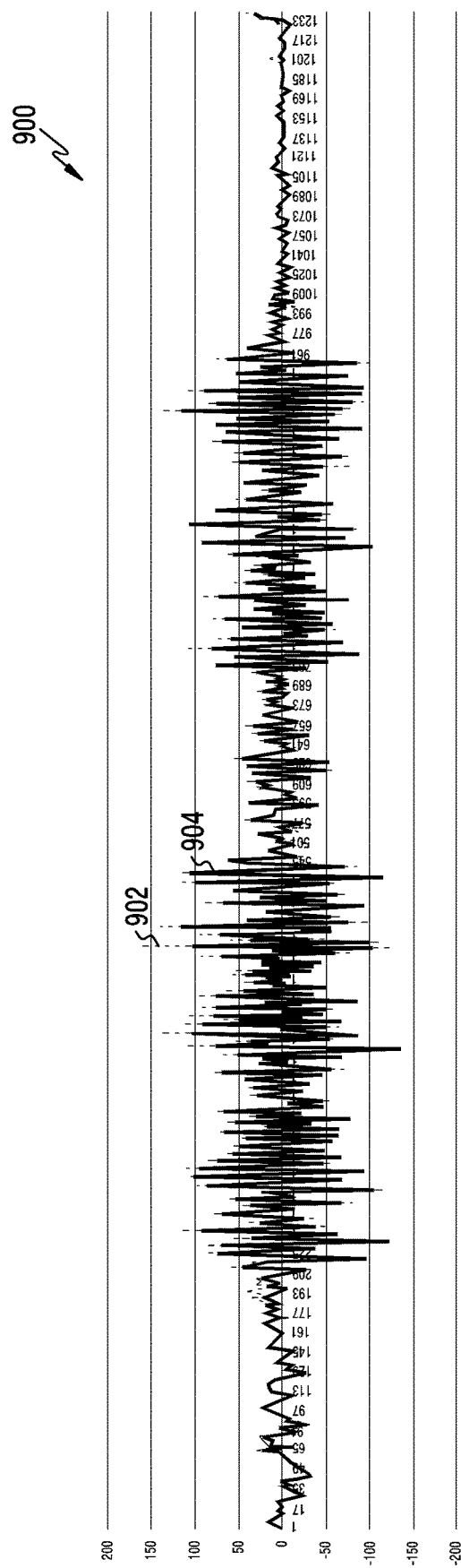
FIG. 9A illustrates an operation of processing motion information detected by an electronic device, according to an embodiment.
Figure 9B:
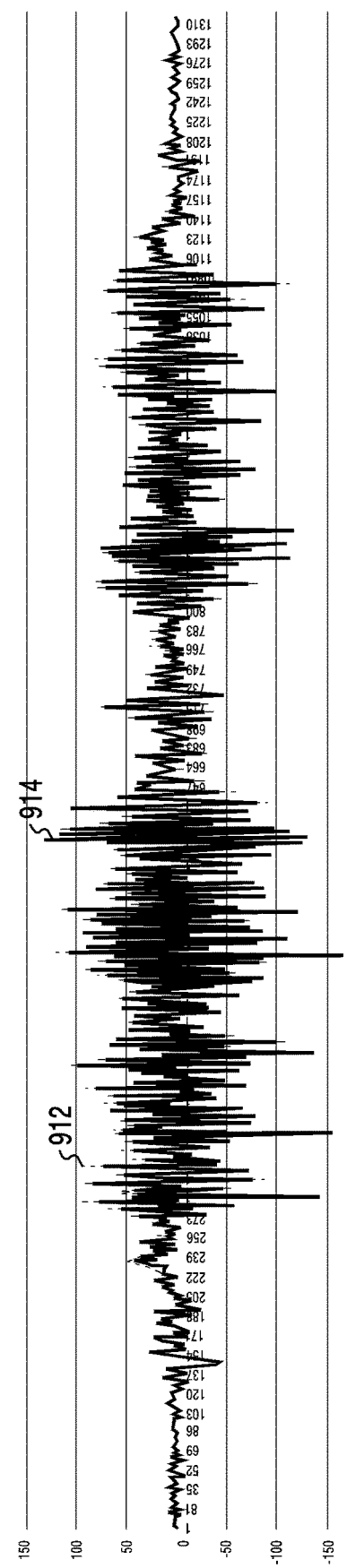
FIG. 9B illustrates an operation of processing motion information detected by an electronic device, according to an embodiment.

FIG. 8 is a flowchart 800 for describing an operation of correcting rolling shutter distortion by an electronic device, according to an embodiment. FIGS. 9A and 9B are a view 900 illustrating an operation of processing motion information detected by an electronic device, according to various embodiments. The steps of FIG. 8 described below may represent various embodiments of step 730. In the following embodiments, the steps may be performed sequentially, but are not necessarily performed sequentially. For example, the order of each step may be changed, or at least two steps may be performed in parallel.

Referring to FIG. 8, the electronic device (e.g., the processor 340) detects a motion detection frequency change event in step 810. The motion detection frequency may be associated with the performance of shaking correction and rolling shutter distortion correction. For example, the higher the motion detection frequency, the better the correction performance of the image. The processor 340 may sense, as a motion detection frequency change event, a situation in which motion of the electronic device exceeding the reference motion or a number of images (e.g., frame rate) exceeding the reference frame rate is sensed.

The electronic device determines whether the motion detection frequency is changeable, in response to the motion detection frequency change event, in step 820. The processor 340 may determine whether the detection frequency is changed based on state information of the electronic device. For example, state information of the electronic device may include at least one of a heating state of the electronic device, a remaining battery state of the electronic device, and a process operational capability state of the electronic device.

If a motion detection frequency is changeable, the electronic device changes the motion detection frequency and acquire motion information in step 830, based on the changed detection frequency. The processor 340 may change the detection frequency of the motion information from a first frequency (e.g., 100 Hz) to a second frequency (e.g. 500 Hz), which is higher than the first frequency, in response to the detection of a detection frequency event. As described above, the processor 340 may increase the amount of motion information used for shaking correction of an image by changing the detection frequency, thereby improving image correction performance. In addition, the electronic device may correct the image in step 840 based on the acquired motion information.

If the motion detection frequency is not changeable, the electronic device processes the detected motion information in step 850. The processing of the motion information may include increasing the amount of motion information used for shaking correction on the image. The processor 340 may generate additional motion information by interpolating the detected motion information.

The graph of FIG. 9A shows the analysis of motion information in a frequency domain according to a first detection frequency (e.g., 200 Hz), and the graph of FIG. 9B shows the analysis of motion information in a frequency domain according to a second detection frequency (e.g., 500 Hz). In addition, the Y axis of the graph represents a motion vector, the X axis thereof represents the number of frames in an image, the dotted lines 902 and 912 represent first motion information (e.g., motion with respect to a subject or background) obtained through the input image, and the solid lines 904 and 914 represent second motion information obtained through a motion sensor of the electronic device. The difference between the first motion information 902 and the second motion information 904 occurs in a part having many changes in the graph of FIG. 9A. Almost no difference between the first motion information 912 and the second motion information 914 occurs in a part having many changes in the graph of FIG. 9B. For example, the processor 340 may process the motion information detected based on the first frequency so as to make the motion information the same as or similar to the motion information detected based on the second frequency. In addition, the electronic device may correct the image in step 860 based on the processed motion information.

Figure 10:
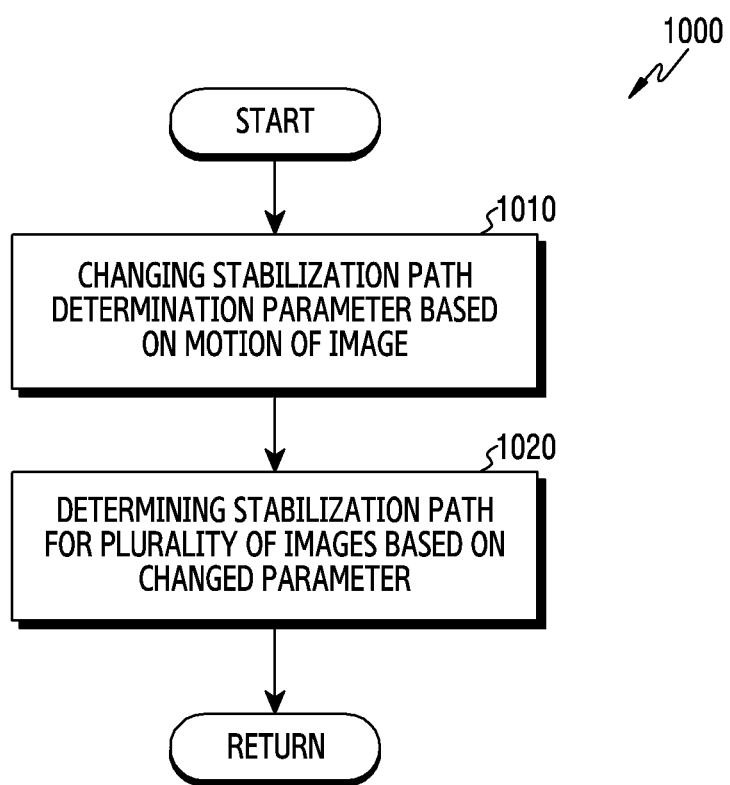
FIG. 10 is a flowchart describing an operation of determining a stabilization path by an electronic device, according to an embodiment.
Figure 11A:
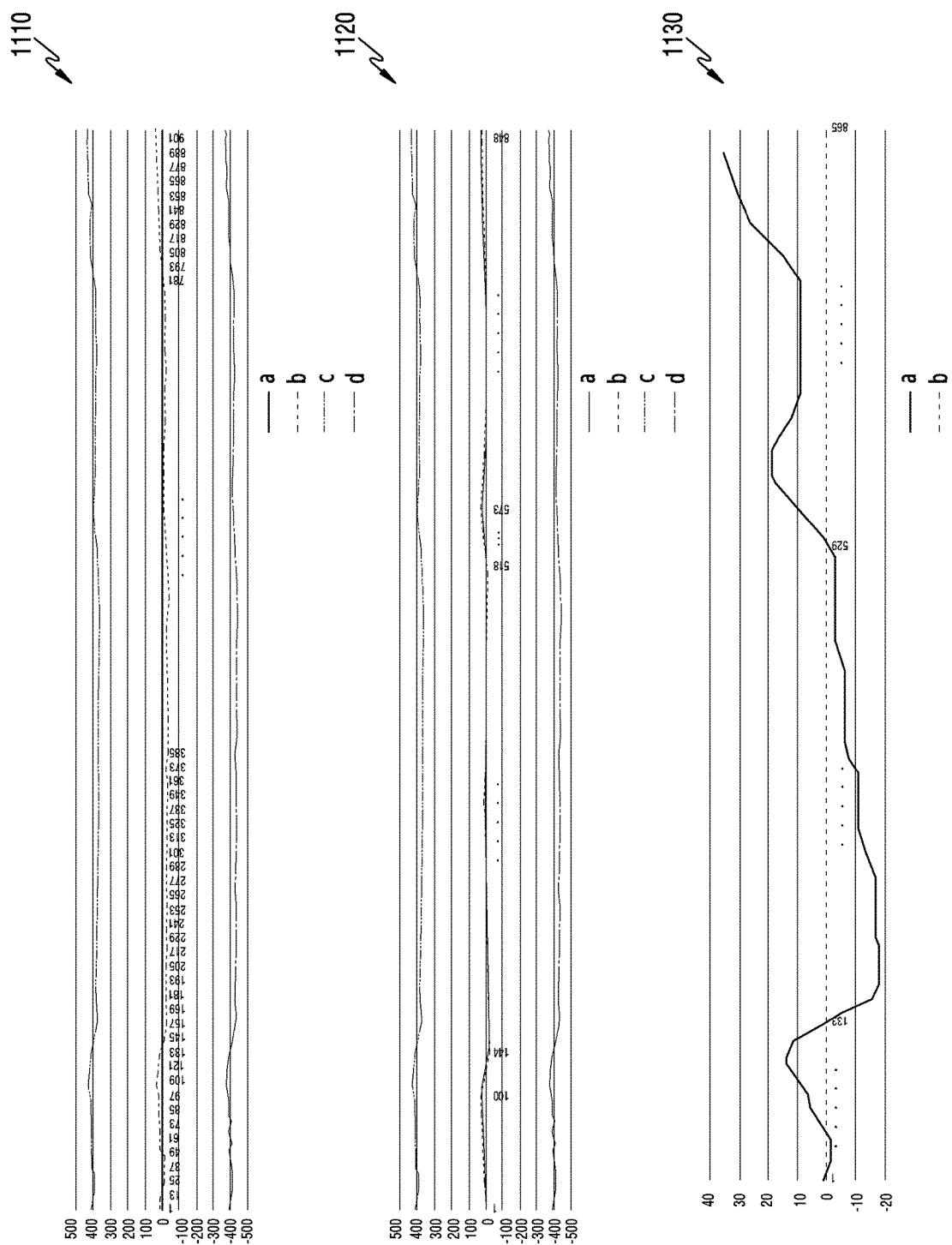
FIG. 11A illustrates a parameter used to determine a stabilization path by an electronic device, according to an embodiment.
Figure 11B:
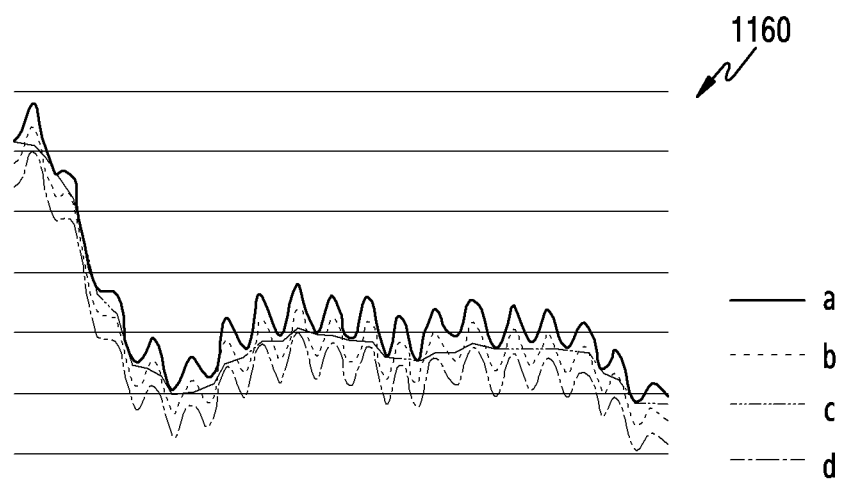
FIG. 11B illustrates a parameter used to determine a stabilization path by an electronic device, according to an embodiment.
Figure 11B:
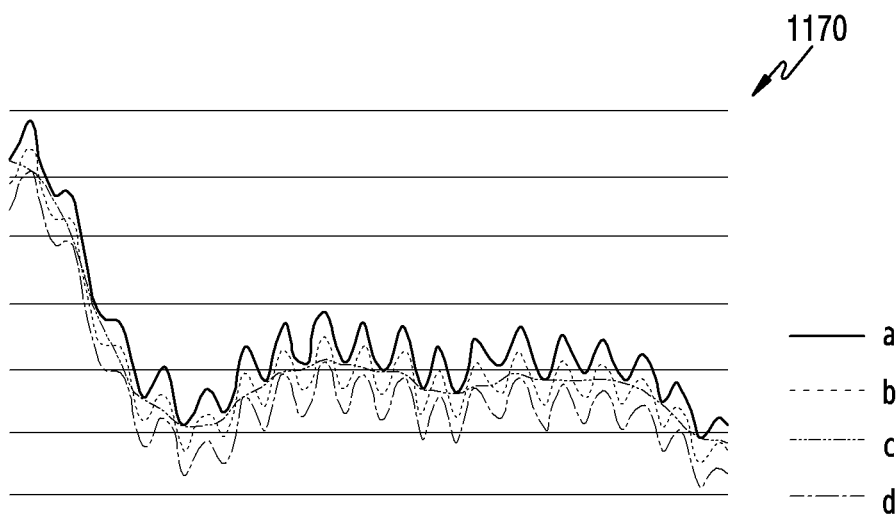
Figure 11B:
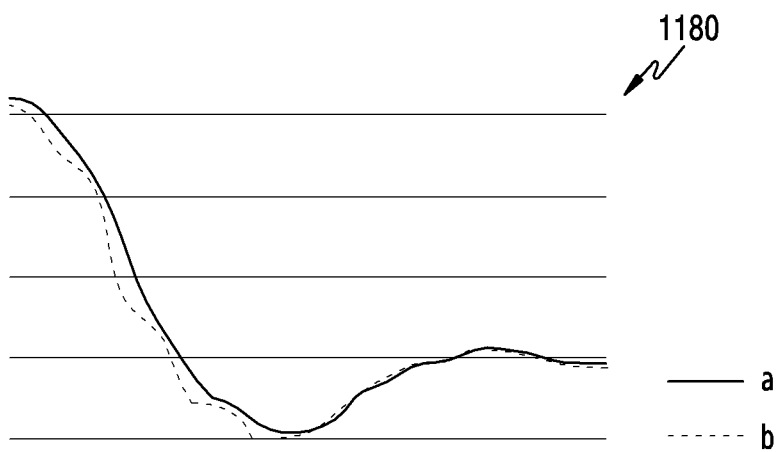

FIG. 10 is a flowchart 1000 describing an operation of determining a stabilization path by an electronic device, according to an embodiment. FIG. 11A describes a parameter used to determine a stabilization path in an electronic device, according to an embodiment. FIG. 11B describes a parameter used to determine a stabilization path in an electronic device, according to an embodiment. The steps of FIG. 10 described below may represent various embodiments of step 720. In the following embodiments, the steps may be performed sequentially, but are not necessarily performed sequentially. For example, the order of step operation may be changed, or at least two steps may be performed in parallel.

Referring to FIG. 10, the electronic device (e.g., the processor 340) changes a stabilization path determination parameter in step 1010 based on the motion information of the image (or the electronic device).

The processor 340 may determine a stabilization path by using different parameters for the case in which motion escapes from a specified level (e.g., if there is a lot of motion at a specified motion vector) and the case in which the motion does not escape therefrom.

The graph 1110 and the graph 1120 of FIG. 11A show parameters (e.g., first parameters) corresponding to the case in which motion does not exceed a specified level (e.g., the case in which motion is small, such as in the state in which an electronic device is held in a user's hand). In addition, the Y axis of each graph represents a motion vector, the X axis thereof represents the number of image frames, and the two-dot chain line (c) and the one-dot chain line (d) represent the maximum value of a correction range and the minimum value of the correction range, respectively. Further, the solid line (a) represents the position (or trajectory) of a camera after the stabilization path determination, and the dotted line (b) represents the position (or trajectory) of the camera before the stabilization path determination.

As noted from the graph 1110 of FIG. 11A, if the stabilization path is determined using the first parameter in a small-motion state, the propensity for the camera position, after the stabilization path determination, to show a straight line increases. This means that the amount of motion correction is determined by the difference between the solid line (a) and the dotted line (b), and thus if the stabilization path is determined using the first parameter in the small-motion state, the shaking of the image has been corrected. On the other hand, as noted from the graph 1120 of FIG. 11A, if the stabilization path is determined using the second parameter in a small-motion state, there is a trend that the camera position after the stabilization path determination becomes similar to the position of the camera before the stabilization path determination. This means that there is almost no difference between the solid line (a) and the dotted line (b), and thus if the stabilization path is determined using the second parameter in the small-motion state, the performance of image-shaking correction is deteriorated. Specifically, if comparing the relationship between the small-motion state, the large-motion state and the first parameter, in the small-motion state, as shown in the graph 1130 of FIG. 11A, if the stabilization path is determined by the second parameter, the camera position is parallel, as represented by the dotted line (b), to the X axis regardless of changing the camera position before the stabilization path determination, which means that the performance of the image-shaking correction is improved. On the other hand, in the large-motion state, if the stabilization path is determined by the first parameter, the camera position is not parallel, as represented by the solid line (a), to the X axis along the changing camera position before the stabilization path determination, and thus the performance of the image-shaking correction is deteriorated.

The graph 1160 and the graph 1170 of FIG. 11B show parameters (e.g., second parameters) corresponding to the case in which motion exceeds a specified level (e.g., the case of a large-motion state). In addition, the Y axis of each graph represents a motion vector, the X axis thereof represents the number of image frames, and the solid line (a) and the one-dot chain line (d) represent the maximum value of a correction range and the minimum value of the correction range, respectively. Further, the dotted line (b) represents the position (or trajectory) of a camera before the stabilization path determination, and the two-dot chain line (c) represents the position (or trajectory) of the camera after the stabilization path determination. As noted from the graph 1160 of FIG. 11B, if the stabilization path is determined using the second parameter in a large-motion state, the camera position after the stabilization path determination has a rugged form (e.g., a form in which the difference between the camera position before the stabilization path determination and the camera position after the stabilization path determination is small). On the other hand, as noted from the graph 1170 of FIG. 11B, if the stabilization path is determined using the second parameter in a large-motion state, the camera position after the stabilization path determination has a curved form (e.g., the difference between the camera position before the stabilization path determination and the camera position after the stabilization path determination is relatively large). Specifically, comparing the relationship, in a large-motion state, between the small-motion state, the large-motion state and the second parameter, as shown in the graph 1180 of FIG. 11B, if the stabilization path is determined by the first parameter (e.g., dotted line (b)), the performance of the image-shaking correction is deteriorated. On the other hand, in the large-motion state, if the stabilization path is determined by the second parameter (e.g., solid line (a)), the performance of the image-shaking correction is improved.

The electronic device (e.g., the processor 340) determines a stabilization path for a plurality of images based on the changed parameter in step 1020. The image stabilization path serves to calculate the shortest distance to a camera from an input image, and the processor 340 may adjust the amount of the input image that is used to determine the stabilization path, based on the motion of the image. For example, the processor 340 may determine a stabilization path by using a greater number of input images in the case in which motion escapes from a specified level (e.g., if the motion is large at a specified motion vector) than the case in which the motion does not escape therefrom (e.g., if the motion is small at the specified motion vector).

Figure 12:
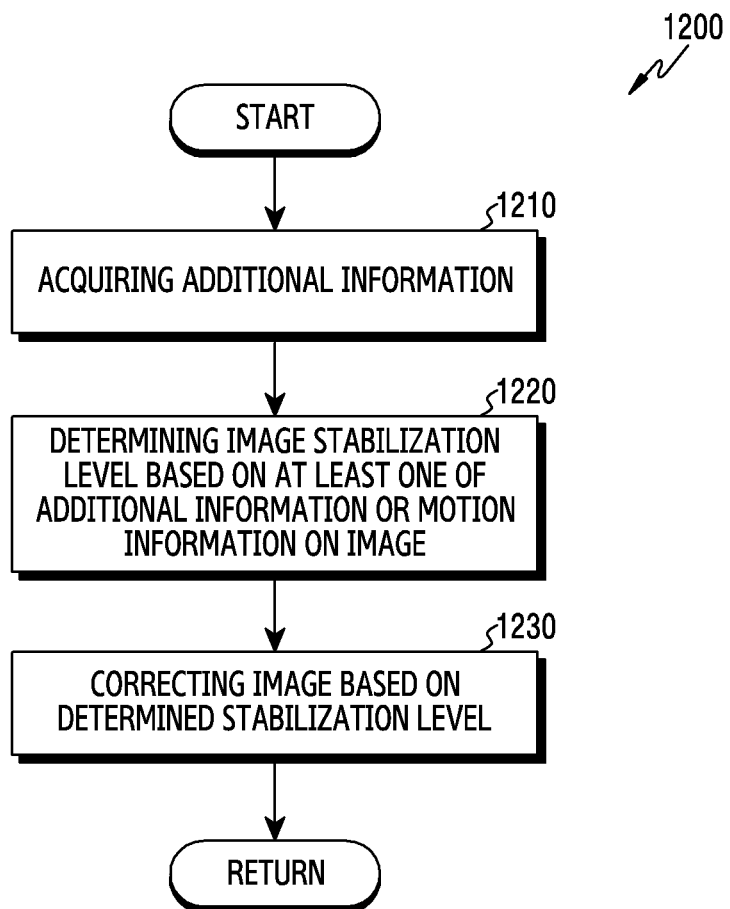
FIG. 12 is a flowchart describing an operation of correcting at least one image by an electronic device, according to according to an embodiment.
Figure 13A:
FIG. 13A illustrates a situation in which notification information corresponding to a stabilization level is output by an electronic device, according to an embodiment.
Figure 13B:
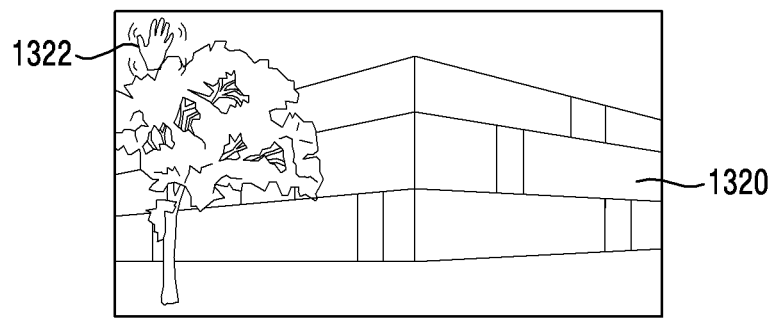
FIG. 13B illustrates a situation in which notification information corresponding to a stabilization level is output by an electronic device, according to an embodiment.

FIG. 12 is a flowchart 1200 describing an operation of correcting at least one image by an electronic device, according to an embodiment. FIG. 13A is a view 1300 illustrating the situation in which the electronic device outputs notification information corresponding to a stabilization level, according to an embodiment. FIG. 13B is a view 1300 illustrating the situation in which the electronic device outputs notification information corresponding to a stabilization level, according to an embodiment. The operations of FIG. 12 described below may represent various embodiments of step 730. In the following embodiments, the steps may be performed sequentially, but are not necessarily performed sequentially. For example, the order of each step may be changed, or at least two steps may be performed in parallel.

Referring to FIG. 12, the electronic device (e.g., the processor 340) acquires additional information while correcting at least one image in step 1210. The additional information may include ambient brightness information.

The electronic device determines a stabilization level (or correction intensity), in step 1220, based on at least one of additional information or motion information of an image. For example, the processor 340 may adjust the correction intensity so as to reduce an image jitter phenomenon that may occur during image stabilization. If the ambient brightness and the motion satisfy the specified first level (e.g., if the motion of the electronic device located in a room is large), the processor 340 may lower the shaking correction performance to the first level and increase the image jitter improvement performance to the second level. In addition, if the ambient brightness and the motion satisfy the specified second level (e.g., if the motion of the electronic device located in a room is small), the processor 340 may also increase the shaking correction performance to the second level and lower the image jitter improvement performance to the first level. The processor 340 may prevent the occurrence of image jitter by lowering a shutter speed to a first speed if motion of the electronic device (or the image) satisfies the specified level (e.g., if the motion is small enough to avoid image jitter) and increasing the shutter speed to a second speed if the motion is out of a range that satisfies the specified level (e.g., the motion is large enough to cause image jitter).

The electronic device corrects an image, in step 1230, based on the determined stabilization level. The processor 340 may output notification information indicating the determined stabilization level through a display device. For example, as shown in FIG. 13A, if the stabilization operation is performed on an input image 1310 having a small motion, the processor 340 may output notification information 1312 corresponding to a small motion (or a low stabilization level). In addition, as shown in FIG. 13B, if the stabilization operation is performed on an input image 1320 having a large motion, the processor 340 may output notification information 1322 corresponding to a large motion (or a high stabilization level).

Figure 14:
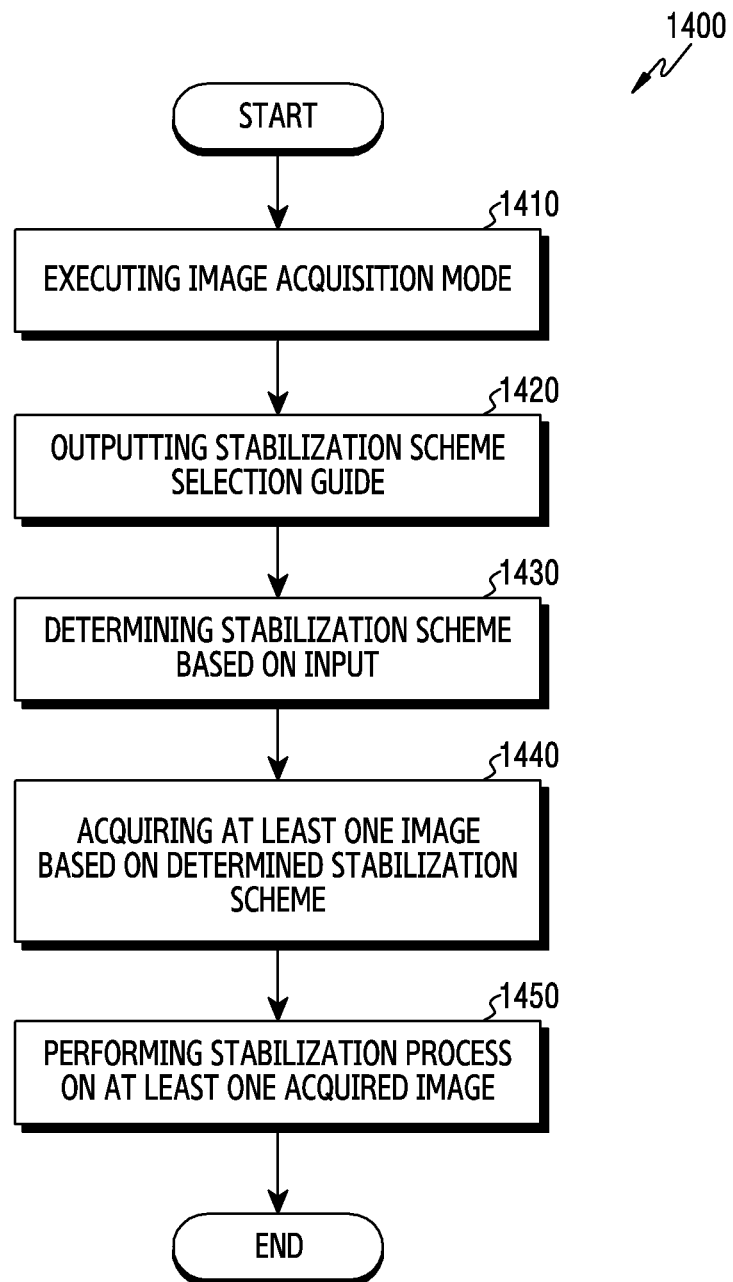
FIG. 14 is a flowchart for performing an image stabilization operation by an electronic device, according to an embodiment.
Figure 15:
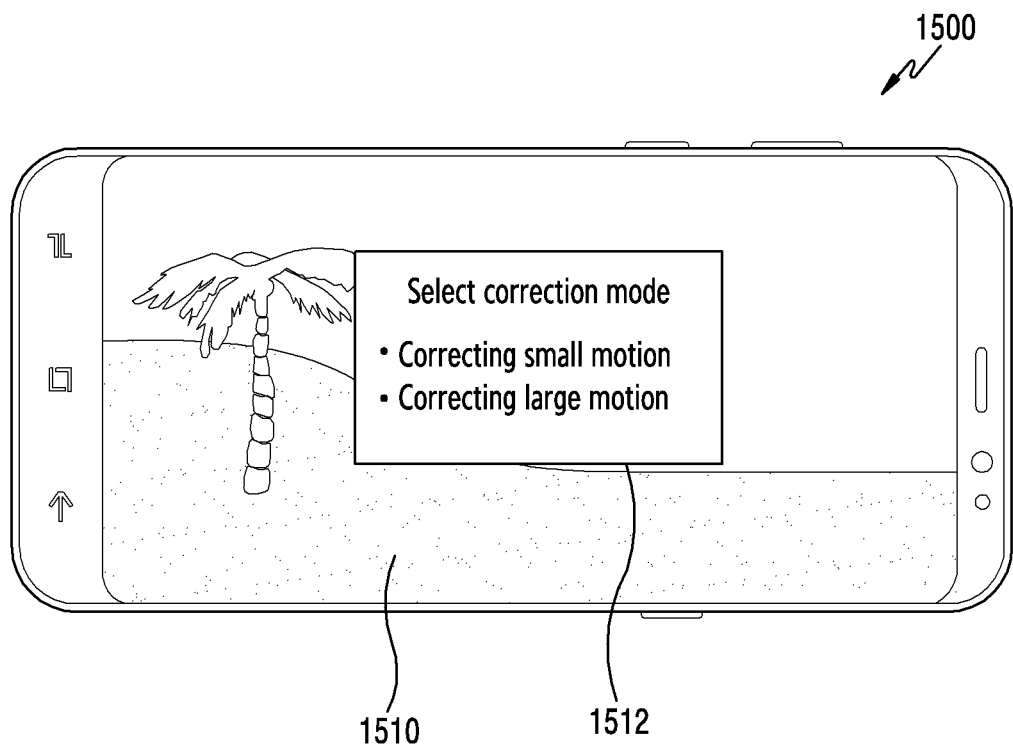
FIG. 15 illustrates a situation in which a stabilization scheme selection guide is provided by an electronic device, according to an embodiment.

FIG. 14 is a flowchart 1400 of an image stabilization operation performed by an electronic device, according to an embodiment. FIG. 15 is a diagram 1500 for describing a situation of providing a stabilization scheme selection guide in an electronic device, according to an embodiment. In the following embodiments, the steps may be performed sequentially, but are not necessarily performed sequentially. For example, the order of each step may be changed, or at least two steps may be performed in parallel.

Referring to FIG. 14, the electronic device (e.g., the processor 340) executes an image acquisition mode in step 1410. As described above, the image acquisition mode may include a mode which acquires at least one image through at least one of the first camera 310 (or the first image acquisition device) or the second camera 320 (or the second image acquisition device).

The electronic device outputs a stabilization scheme selection guide in step 1420. The stabilization scheme selection guide may include a user interface designated to select one of the first stabilization scheme or the second stabilization scheme. The first stabilization scheme may be a scheme, as illustrated in FIG. 5A, for securing a first margin region (e.g., d1 and d2) from a plurality of first-size images 502 acquired through the first camera 310. In addition, the second stabilization scheme may be a scheme, as illustrated in FIG. 5B, for securing a second margin region (e.g., d3 and d4) from a plurality of second-size images 512 acquired through the second camera 320. For example, as illustrated in FIG. 15, the processor 340 may visually output 1520 a stabilization scheme selection guide in the state 1510 in which the image acquisition mode is executed. Additionally or alternatively, the stabilization scheme selection guide may be output in various ways, such as acoustically, tactually, or a combination thereof.

The electronic device determines a stabilization scheme, in step 1430, based on input. The processor 340 may determine one of the first stabilization scheme and the second stabilization scheme, based on input sensed through the output stabilization scheme selection guide.

The electronic device acquires at least one image, in step 1440, based on the determined stabilization scheme. The processor 340 may operate a camera corresponding to the determined stabilization scheme. For example, the processor 340 may operate the first camera 310 in response to the selection of the first stabilization scheme. In addition, the processor 340 may operate the second camera 320 in response to the selection of the second stabilization scheme.

The electronic device performs stabilization on at least one acquired image in step 1450. The processor 340 may correct shaking of an image using video digital image stabilization technology.

According to an embodiment, a method for operating an electronic device may include acquiring motion information of the electronic device according to an image acquisition mode; determining an image stabilization scheme, based on at least a part of the motion information; and performing a stabilization operation on at least one image acquired through the camera, based on the determined image stabilization scheme. The image stabilization scheme may include a first stabilization scheme for correcting shaking of the at least one image based on a first margin region and a second stabilization scheme for correcting shaking of the at least one image based on a second margin region larger than the first margin region.

Performing the stabilization operation may include activating a first camera having a first angle of view, in response to a determination of the first stabilization scheme; and activating a second camera having a second angle of view wider than the first angle of view, in response to a determination of the second stabilization scheme.

Performing the stabilization operation may include determining an image acquisition speed at which the plurality of images are acquired; and determining a detection frequency of the motion information of the electronic device based on at least one of the image acquisition speed and the motion size.

Performing the stabilization operation may include processing the obtained motion information if it is impossible to change to the determined detection frequency.

Performing the stabilization operation may include determining a parameter of a stabilization path for correcting the at least one image based on motion information of the electronic device.

Performing the stabilization operation may include determining an ambient brightness of the electronic device; and determining an intensity of a stabilization operation based on at least one of the ambient brightness or the size of the motion of the electronic device.

Determining the intensity of the stabilization operation may include outputting notification information corresponding to the determined intensity.

Performing the stabilization operation may include detecting a motion of the electronic device in a state in which one of the first image stabilization scheme and the second image stabilization scheme is selected; and changing the selected image stabilization scheme to another image stabilization scheme if the detected motion satisfies a stabilization scheme change condition.

Changing the image stabilization scheme to another image stabilization scheme may include outputting information providing notification of the changed image stabilization scheme.

According to various embodiments, the electronic device is capable of improving shaking correction performance of a large motion as well as a small motion by selectively using a first image stabilization scheme or a second image stabilization scheme, based on at least a part of motion information. In addition, the electronic device may enable a user to select a desired scheme among the first image stabilization scheme or the second image stabilization scheme, and to correct an image by outputting a user interface designated to select the first image stabilization scheme or the second image stabilization scheme according to executing an image acquisition mode.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a first camera having a first angle of view;
   a second camera having a second angle of view wider than the first angle of view;
   a motion sensor configured to obtain motion information of the electronic device;
   a display;
   a memory storing at least one instruction; and
   a processor executing the at least one instruction stored in the memory,
   wherein the processor causes the electronic device to:
     enter a video capturing mode in which the first camera or the second camera is activated;
     display a live-preview corresponding to the video capturing mode using images obtained via the first camera or the second camera;
     while in the video capturing mode, display a user interface including a first graphical object indicative of a first degree of motion stabilization and a second graphical object indicative of a second degree of motion stabilization greater than the first degree of motion stabilization;
     receive an input via the user interface to select one of the first graphical object or the second graphical object;
     based on the first graphical object being selected, display a live-preview by performing, based on the motion information and a first marginal area having a first size, a first digital image stabilization with respect to images obtained via the first camera; and
     based on the second graphical object being selected, display a live-preview by performing, based on the motion information and a second marginal area having a second size larger than the first size, a second digital image stabilization with respect to images obtained via the second camera.

2. The electronic device of claim 1, wherein the processor is further configured to:
   while the live-preview is displayed using a corresponding set of a first set of images and a second set of images, receive a request to capture a video;
   in response to the corresponding set being the first set of images, generate the video using at least one image of the first set of images as stabilized according to the first digital image stabilization; and
   in response to the corresponding set being the second set of images, generate the video using at least one image of the second set of images as stabilized according to the second digital image stabilization.

3. The electronic device of claim 1, wherein the processor is further configured to:
   as part of the performing of the first digital image stabilization, cropping a first area determined based at least in part on the motion information from one or more images; and
   as part of the performing of the second digital image stabilization, cropping a second area determined based at least in part on the motion information from one or more of images.

4. The electronic device of claim 3, wherein the processor is further configured to:
   as part of the cropping of the first area, determine a size of the first area based at least in part on excluding the first marginal area from a first imaging area of the first camera corresponding to the first angle of view; and
   as part of the cropping of the second area, determine a size of the second area based at least in part on excluding the second marginal area from a second imaging area of the second camera corresponding to the second angle of view.

5. The electronic device of claim 1, wherein a third angle of view corresponding to the first set of images is narrower than the first angle of view, and a fourth angle of view corresponding to the second set of images is narrower than the second angle of view.

6. The electronic device of claim 1, wherein the processor is further configured to:
   present, via the display, a first notification indicative of the first degree of motion stabilization in response to an activation of the first digital stabilization; and
   present, via the display, a second notification indicative of the second degree of motion stabilization in response to an activation of the second digital stabilization.

7. An electronic device comprising:
   a first camera having a first angle of view;
   a second camera having a second angle of view wider than the first angle of view;
   a motion sensor configured to obtain motion information of the electronic device;
   a display;
   a memory storing at least one instruction; and
   a processor executing the at least one instruction stored in the memory,
   wherein the processor causes the electronic device to:
     display a live-preview by performing, based on the motion information and a first marginal area having a first size, a first digital image stabilization with respect to images obtained via the first camera,
     while displaying the live-preview by performing the first digital image stabilization, display a first graphical object indicative of a first degree of motion stabilization corresponding to the first digital image stabilization,
     in response to a user input for changing from the first digital image stabilization to the second digital image stabilization, display a live-preview by performing, based on the motion information and a second marginal area having a second size larger than the first size, the second digital image stabilization with respect to images obtained via the second camera, and while displaying the live-preview by performing the second digital image stabilization, display a second graphical object indicative of a second degree of motion stabilization corresponding to the second digital image stabilization.

8. The electronic device of claim 7, wherein the processor is further configured to:

while the live-preview image is displayed using a corresponding set of the first set of images and the second set of images, receive a request to capture a video, in response to the corresponding set being the first set of images, generate the video using at least one image of the first set of images as stabilized according to the first digital image stabilization, and in response to the corresponding set being the second set of images, generate the video using at least one image of the second set of images as stabilized according to the second digital image stabilization.

9. The electronic device of claim 7, wherein the processor is further configured to:

as part of the performing of the first digital image stabilization, cropping a first area determined based at least in part on the motion information from one or more images, and as part of the performing of the second digital image stabilization, cropping a second area determined based at least in part on the motion information from one or more images.

10. The electronic device of claim 9, wherein the processor is further configured to:

as part of the cropping of the first area, determine a size of the first area based at least in part on excluding the first marginal area from a first imaging area of the first camera corresponding to the first angle of view, and as part of the cropping of the second area, determine a size of the second area based at least in part on excluding the second marginal area from a second imaging area of the second camera corresponding to the second angle of view.

11. A method of operating an electronic device comprising a first camera having a first angle of view and a second camera having a second angle of view wider than the first angle of view, the method comprising:

entering a video capturing mode in which the first camera or the second camera is activated;

displaying a live-preview corresponding to the video capturing mode using images obtained via the first camera or the second camera;

while in the video capturing mode, displaying a user interface including a first graphical object indicative of a first degree of motion stabilization and a second graphical object indicative of a second degree of motion stabilization greater than the first degree of motion stabilization;

receiving an input via the user interface to select one of the first graphical object or the second graphical object;

obtaining, via a motion sensor, motion information of the electronic device;

based on the first graphical object being selected, displaying a live-preview by performing, based on the motion information and a first marginal area having a first size, a first digital image stabilization with respect to images obtained via the first camera; and based on the second graphical object being selected, display a live-preview by performing, based on the motion information and a second marginal area having a second size lager than the first size, a second digital image stabilization with respect to images obtained via the second camera.

12. The method of claim 11, further comprising:

while the live-preview is displayed using a corresponding set of the first set of images and the second set of images, receiving a request to capture a video;

in response to the corresponding set being the first set of images, generating the video using at least one image of the first set of images as stabilized according to the first digital image stabilization; and in response to the corresponding set being the second set of images, generating the video using at least one image of the second set of images as stabilized according to the second digital image stabilization.

13. The method of claim 11, wherein performing the first digital image stabilization comprises cropping a first area determined based at least in part on the motion information from each of one or more of images, and wherein performing the second digital image stabilization, cropping a second area determined based at least in part on the motion information from each of one or more of images.

14. The method of claim 13, wherein cropping the first area comprises determining a size of the first area based at least in part on excluding the first marginal area from a first imaging area of the first camera corresponding to the first angle of view, and wherein cropping the second area comprises determining a size of the second area based at least in part on excluding the second marginal area from a second imaging area of the second camera corresponding to the second angle of view.

15. The method of claim 11, wherein a third angle of view corresponding to the first set of images is narrower than the first angle of view, and a fourth angle of view corresponding to the second set of images is narrower than the second angle of view.

16. The method of claim 11, further comprising:

presenting, via a display, a first notification indicative of the first degree of motion stabilization in response to an activation of the first digital stabilization; and presenting, via the display, a second notification indicative of the second degree of motion stabilization in response to an activation of the second digital stabilization.

17. A method of operating an electronic device comprising a first camera having a first angle of view and a second camera having a second angle of view wider than the first angle of view, comprising:

obtaining, via a motion sensor, motion information of the electronic device;

displaying a live-preview by performing, based on the motion information and a first marginal area having a first size, a first digital image stabilization with respect to images obtained via the first camera, while displaying the live-preview by performing the first digital image stabilization, displaying a first graphical object indicative a first degree of motion stabilization corresponding to the first digital image stabilization, in response to a user input for changing from the first digital image stabilization to the second digital image stabilization, display a live-preview by performing, based on the motion information and a second marginal area having a second size larger than the first size, the second digital image stabilization with respect to images obtained via the second camera, and while displaying the live-preview by performing the second digital image stabilization, displaying a second graphical object indicative of a second degree of motion stabilization corresponding to the second digital image stabilization.

18. The method of claim 17, further comprising:

while the live-preview image is displayed using a corresponding set of the first set of images and the second set of images, receiving a request to capture a video;

in response to the corresponding set being the first set of images, generating the video using at least one image of the first set of images as stabilized according to the first digital image stabilization; and in response to the corresponding set being the second set of images, generating the video using at least one image of the second set of images as stabilized according to the second digital image stabilization.

19. The method of claim 17, wherein performing the first digital image stabilization comprises cropping a first area determined based at least in part on the motion information from one or more images, and wherein performing the second digital image stabilization comprises cropping a second area determined based at least in part on the motion information from one or more images.

20. The method of claim 19, wherein cropping the first area comprises determining a size of the first area based at least in prat on excluding the first marginal area from a first imaging area of the first camera corresponding to the first angle of view, and wherein cropping the second area comprises determining a size of the second area based at least in part on excluding the second marginal area from a second imaging area of the second camera corresponding to the second angle of view.

21. A non-transitory computer readable medium comprising instructions, which, when executed by an electronic device, cause the electronic device to perform operations comprising:

entering a video capturing mode in which a first camera or a second camera is activated;

displaying a live-preview corresponding to the video capturing mode using images obtained via the first camera or the second camera;

while in the video capturing mode, displaying a user interface including a first graphical object indicative of a first degree of motion stabilization and a second graphical object indicative of a second degree of motion stabilization greater than the first degree of motion stabilization;

receiving an input via the user interface to select one of the first graphical object or the second graphical object;

obtaining, via a motion sensor, motion information of the electronic device;

based on the first graphical object being selected, displaying a live-preview by performing, based on the motion information and a first marginal area having a first size, a first digital image stabilization with respect to images obtained via the first camera; and based on the second graphical object being selected, display a live-preview by performing, based on the motion information and a second marginal area having a second size larger than the first size, a second digital image stabilization with respect to images obtained via the second camera.

22. The computer readable medium of claim 21, wherein the instructions further cause the electronic device to perform operations comprising:

while the live-preview is displayed using a corresponding set of the first set of images and the second set of images, receiving a request to capture a video;

in response to the corresponding set being the first set of images, generating the video using at least one image of the first set of images as stabilized according to the first digital image stabilization; and in response to the corresponding set being the second set of images, generating the video using at least one image of the second set of images as stabilized according to the second digital image stabilization.

* * * * *